United States Patent
Paczkowski et al.

(10) Patent No.: US 9,578,664 B1
(45) Date of Patent: Feb. 21, 2017

(54) TRUSTED SIGNALING IN 3GPP INTERFACES IN A NETWORK FUNCTION VIRTUALIZATION WIRELESS COMMUNICATION SYSTEM

(71) Applicant: Sprint Communications Company L.P., Overland Park, KS (US)

(72) Inventors: Lyle W. Paczkowski, Mission Hills, KS (US); Amar N. Ray, Shawnee, KS (US); James P. Sisul, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 6 days.

(21) Appl. No.: 14/746,615

(22) Filed: Jun. 22, 2015

Related U.S. Application Data

(63) Continuation-in-part of application No. 13/762,319, filed on Feb. 7, 2013, now Pat. No. 9,161,227.

(51) Int. Cl.
| | |
|---|---|
| *H04W 12/08* | (2009.01) |
| *H04W 76/02* | (2009.01) |
| *H04W 88/16* | (2009.01) |
| *H04W 12/00* | (2009.01) |

(52) U.S. Cl.
CPC .......... *H04W 76/022* (2013.01); *H04W 12/00* (2013.01); *H04W 88/16* (2013.01)

(58) Field of Classification Search
CPC .... H04W 76/022; H04W 12/00; H04W 12/06; H04W 12/08; H04W 88/16; H04W 36/0022; H04W 36/0038
USPC .................. 370/328, 329, 252; 455/410, 411
See application file for complete search history.

(56) References Cited

U.S. PATENT DOCUMENTS

| | | |
|---|---|---|
| 5,303,378 A | 4/1994 | Cohen |
| 5,321,735 A | 6/1994 | Breeden et al. |
| 5,764,889 A | 6/1998 | Ault et al. |
| 5,796,952 A | 8/1998 | Davis et al. |
| 5,928,363 A | 7/1999 | Ruvolo |
| 5,983,350 A | 11/1999 | Minear et al. |

(Continued)

FOREIGN PATENT DOCUMENTS

| | | |
|---|---|---|
| EP | 1933252 A1 | 6/2008 |
| WO | WO2011025433 A1 | 3/2011 |

(Continued)

OTHER PUBLICATIONS

European Examination Report dated Mar. 3, 2016, EPC Application Serial No. , filed on.

(Continued)

*Primary Examiner* — Afsar M Qureshi

(57) ABSTRACT

A method for providing a trusted communication link in a wireless network. A mobility management entity (MME) interface of a MME virtualized network function (VNF) receives a trusted communication request. A MME interface trustlet is allocated to execute in a trusted security zone of compute resources provided by a virtual computing environment in which the MME VNF executes. The MME interface trustlet establishes trusted signaling with two or more different VNFs provided by virtual servers executing in the virtual computing environment. The MME interface trustlet sends a trust token to the eNB to establish the trusted communication link from the eNB via a virtualized network function path through the virtual computing environment.

20 Claims, 19 Drawing Sheets

(56) References Cited

U.S. PATENT DOCUMENTS

| | | |
|---|---|---|
| 6,131,024 A | 10/2000 | Boltz |
| 6,177,860 B1 | 1/2001 | Cromer et al. |
| 6,219,712 B1 | 4/2001 | Mann et al. |
| 6,363,150 B1 | 3/2002 | Bhagavath et al. |
| 6,389,403 B1 | 5/2002 | Dorak, Jr. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,754,784 B1 | 6/2004 | North et al. |
| 6,775,772 B1 | 8/2004 | Binding et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 | 5/2006 | Sladek et al. |
| 7,069,234 B1 | 6/2006 | Cornelius et al. |
| 7,305,712 B2 | 12/2007 | Watt et al. |
| 7,325,083 B2 | 1/2008 | Watt et al. |
| 7,340,573 B2 | 3/2008 | Watt |
| 7,366,806 B2 | 4/2008 | Milenkovic et al. |
| 7,370,210 B2 | 5/2008 | Symes |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,661,104 B2 | 2/2010 | Watt et al. |
| 7,716,720 B1 | 5/2010 | Marek et al. |
| 7,761,558 B1 | 7/2010 | Jindal et al. |
| 7,849,296 B2 | 12/2010 | Watt et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,090,797 B2 | 1/2012 | Chinta et al. |
| 8,112,794 B2 | 2/2012 | Little et al. |
| 8,171,483 B2 | 5/2012 | Nord et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,271,976 B2 | 9/2012 | Vega et al. |
| 8,280,944 B2 | 10/2012 | Laadan et al. |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,230 B1 | 5/2013 | James-Roxby et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1* | 4/2014 | Cope ............... H04W 4/00 455/41.1 |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2* | 8/2014 | Garcia Martin ........... H04W 28/08 370/235 |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1* | 10/2015 | Bye ............... H04W 12/08 |
| 9,161,325 B1 | 10/2015 | Urbanek |
| 9,171,243 B1 | 10/2015 | Cordes et al. |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,191,865 B1* | 11/2015 | Paczkowski ........... H04W 76/02 |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,392,446 B1 | 7/2016 | Paczkowski et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0107958 A1 | 8/2002 | Faraldo |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0177387 A1 | 9/2003 | Osterwalder et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0064351 A1 | 4/2004 | Mikurak |
| 2004/0139352 A1 | 7/2004 | Shewchuk et al. |
| 2004/0158840 A1 | 8/2004 | Rothman et al. |
| 2004/0177269 A1 | 9/2004 | Belnet et al. |
| 2004/0181682 A1 | 9/2004 | Orino et al. |
| 2004/0187117 A1 | 9/2004 | Orion et al. |

(56) References Cited

U.S. PATENT DOCUMENTS

| | | |
|---|---|---|
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0260910 A1 | 12/2004 | Watt et al. |
| 2004/0264372 A1 | 12/2004 | Huang |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0102603 A1 | 5/2005 | Tapper et al. |
| 2005/0114616 A1 | 5/2005 | Tune et al. |
| 2005/0123596 A1 | 6/2005 | Kohane et al. |
| 2005/0125396 A1 | 6/2005 | Liu |
| 2005/0138421 A1 | 6/2005 | Fedronic et al. |
| 2005/0138433 A1 | 6/2005 | Linetsky |
| 2005/0160210 A1 | 7/2005 | Watt et al. |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0146767 A1 | 7/2006 | Moganti |
| 2006/0156026 A1 | 7/2006 | Utin |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0190614 A1 | 8/2006 | Altman et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0014867 A1 | 1/2008 | Finn |
| 2008/0020745 A1* | 1/2008 | Bae ............... H04W 60/04 455/422.1 |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0162877 A1 | 7/2008 | Altman et al. |
| 2008/0165259 A1 | 7/2008 | Nobels |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2009/0007100 A1 | 1/2009 | Field et al. |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0199177 A1 | 8/2009 | Edwards et al. |
| 2009/0204959 A1 | 8/2009 | Anand et al. |
| 2009/0227290 A1 | 9/2009 | Chien |
| 2009/0241108 A1 | 9/2009 | Edwards et al. |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0300605 A1 | 12/2009 | Edwards et al. |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125512 A1 | 5/2010 | Jones et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0192230 A1 | 7/2010 | Steeves et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |

(56) References Cited

U.S. PATENT DOCUMENTS

| | | |
|---|---|---|
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0119748 A1 | 5/2011 | Edwards et al. |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0173443 A1 | 7/2011 | Osterwalder et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1* | 2/2012 | Rahman ............ H04W 36/0055 455/423 |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2012/0331550 A1* | 12/2012 | Raj ...................... G06F 21/575 726/22 |
| 2013/0003543 A1 | 1/2013 | Ludwig |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0055256 A1 | 2/2013 | Banga et al. |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0091568 A1 | 4/2013 | Sharif et al. |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0262264 A1 | 10/2013 | Karstoft |

(56) References Cited

U.S. PATENT DOCUMENTS

| | | | |
|---|---|---|---|
| 2013/0263212 A1 | 10/2013 | Faltyn et al. | |
| 2013/0290709 A1 | 10/2013 | Muppidi et al. | |
| 2013/0305333 A1* | 11/2013 | Katzer | G06F 21/6245 726/7 |
| 2013/0310003 A1 | 11/2013 | Sadhvani et al. | |
| 2013/0313314 A1 | 11/2013 | Jeng et al. | |
| 2013/0331067 A1 | 12/2013 | Coussemaeker et al. | |
| 2013/0332456 A1 | 12/2013 | Arkin | |
| 2013/0343181 A1 | 12/2013 | Stroud et al. | |
| 2013/0345530 A1* | 12/2013 | McRoberts | A61B 5/0022 600/323 |
| 2013/0347064 A1 | 12/2013 | Aissi | |
| 2013/0347103 A1 | 12/2013 | Veteikis et al. | |
| 2014/0007182 A1 | 1/2014 | Qureshi et al. | |
| 2014/0007222 A1 | 1/2014 | Qureshi et al. | |
| 2014/0013327 A1 | 1/2014 | Sherwood et al. | |
| 2014/0033316 A1 | 1/2014 | Paczkowski et al. | |
| 2014/0047548 A1* | 2/2014 | Bye | G06F 21/74 726/26 |
| 2014/0052922 A1 | 2/2014 | Moyer et al. | |
| 2014/0053003 A1 | 2/2014 | Moyer et al. | |
| 2014/0059642 A1 | 2/2014 | Deasy et al. | |
| 2014/0074508 A1 | 3/2014 | Ying et al. | |
| 2014/0089243 A1 | 3/2014 | Oppenheimer | |
| 2014/0089699 A1 | 3/2014 | O'Connor et al. | |
| 2014/0104287 A1 | 4/2014 | Nalluri et al. | |
| 2014/0106709 A1 | 4/2014 | Palamara et al. | |
| 2014/0141718 A1 | 5/2014 | Stromberg et al. | |
| 2014/0155025 A1 | 6/2014 | Parker et al. | |
| 2014/0173747 A1 | 6/2014 | Govindaraju | |
| 2014/0188412 A1 | 7/2014 | Mahajan et al. | |
| 2014/0188738 A1 | 7/2014 | Huxham | |
| 2014/0201374 A1 | 7/2014 | Ashwood-Smith et al. | |
| 2014/0215196 A1 | 7/2014 | Berlin | |
| 2014/0241247 A1 | 8/2014 | Kempf et al. | |
| 2014/0245444 A1 | 8/2014 | Lutas et al. | |
| 2014/0254381 A1 | 9/2014 | Racz et al. | |
| 2014/0267332 A1 | 9/2014 | Chhabra et al. | |
| 2014/0279556 A1 | 9/2014 | Priebatsch et al. | |
| 2014/0279558 A1 | 9/2014 | Kadi et al. | |
| 2014/0281544 A1 | 9/2014 | Paczkowski et al. | |
| 2014/0298026 A1 | 10/2014 | Isozaki et al. | |
| 2014/0298477 A1 | 10/2014 | Castro et al. | |
| 2014/0304803 A1 | 10/2014 | Pope et al. | |
| 2014/0344912 A1 | 11/2014 | Chapman et al. | |
| 2015/0046676 A1 | 2/2015 | Archibald et al. | |
| 2015/0089246 A1 | 3/2015 | Kanai et al. | |
| 2015/0106805 A1 | 4/2015 | Melander et al. | |
| 2015/0117409 A1* | 4/2015 | Ghai | H04W 36/0066 370/331 |
| 2015/0117455 A1 | 4/2015 | Umesh et al. | |
| 2015/0172928 A1 | 6/2015 | Katzer et al. | |
| 2015/0370704 A1 | 12/2015 | Kato | |
| 2015/0373050 A1* | 12/2015 | Dayan | H04L 63/20 726/3 |
| 2016/0004876 A1 | 1/2016 | Bye et al. | |
| 2016/0142396 A1 | 5/2016 | McRoberts et al. | |
| 2016/0157084 A1* | 6/2016 | Tsubouchi | H04W 8/12 455/432.1 |

FOREIGN PATENT DOCUMENTS

| | | |
|---|---|---|
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |
| WO | WO2015039699 A1 | 3/2015 |

OTHER PUBLICATIONS

Notice of Allowance dated May 2, 2016, U.S. Appl. No. 13/863,376, filed Apr. 15, 2013.

Office Action dated May 17, 2016, U.S. Appl. No. 13/802,404, filed Mar. 13, 2013.

First Action Interview Office Action dated Mar. 28, 2016, U.S. Appl. No. 14/681,077, filed Apr. 7, 2015.

Notice of Allowance dated Mar. 26, 2016, U.S. Appl. No. 13/857,139, filed Apr. 4, 2013.

FAIPP Pre-Interview Communication dated Jul. 25, 2016, U.S. Appl. No. 14/703,885, filed May 5, 2015.

Network Functions Virtualisation, "An Introduction, Benefits, Enablers, Challenges & Call for Action," Oct. 22-24, 2012, "SDN an OpenFlow World Congress," Darmstadt-Germany.

Network Functions Virtualisation, "Network Operator Perspectives on Industry Progress," Oct. 14-17, 2012, "SDN an OpenFlow World Congress," Darmstadt-Germany.

Marquardt, Ronald R., et al., "System and Method of a Trusted Computing Operation Mode," filed May 5, 2015, U.S. Appl. No. 14/703,885.

Marquardt, Ronald R., et al., "System and Method of Establishing Trusted Operability Between Networks in a Network Functions Virtualization Environment," filed Sep. 8, 2015, U.S. Appl. No. 14/847,992.

Marquardt, Ronald R., et al., "Dynamic Addition of Network Function Services," filed Nov. 2, 2015, U.S. Appl. No. 14/930,146.

Marquardt, Ronald R., et al., "Support Systems Interactions with Virtual Network Functions in a Trusted Security Zone," filed Oct. 9, 2015, U.S. Appl. No. 14/879,324.

Marquardt, Ronald R., et al., "Securing Communication in a Network Function Virtualization (NFV) Core Network," filed Oct. 1, 2015, U.S. Appl. No. 14/872,936.

Marquardt, Ronald R., et al., "System and Method for Trusted Operability When Moving Between Network Functions Virtualization States," filed Oct. 9, 2015, U.S. Appl. No. 14/879,327.

Ray, Amar N., et al., "IPv6 to IPv4 Data Packet Migration in a Trusted Security Zone," filed Jul. 7, 2015, U.S. Appl. No. 14/793,344.

FAIPP Pre-Interview Communication dated Mar. 20, 2014, U.S. Appl. No. 13/482,731, filed May 29, 2012.

Notice of Allowance dated May 27, 2014, U.S. Appl. No. 13/482,731, filed May 29, 2012.

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

Final Office Action dated Sep. 9, 2013, U.S. Appl. No. 13/440,980, filed Apr. 5, 2012.

Notice of Allowance dated Nov. 29, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

Final Office Action dated Mar. 27, 2014, U.S. Appl. No. 13/470,203, filed May 11, 2012.

Advisory Action dated May 29, 2014, U.S. Appl. No. 13/470,203, filed May 11, 2012.

Office Action dated Aug. 29, 2014, U.S. Appl. No. 13/470,203, filed May 11, 2012.

Notice of Allowance dated Dec. 22, 2014, U.S. Appl. No. 13/470,203, filed May 11, 2012.

FAIPP Pre-Interview Communication dated Jul. 2, 2015, U.S. Appl. No. 14/632,850, filed Feb. 26, 2015.

Final Office Action dated Nov. 6, 2015, U.S. Appl. No. 14/632,850, filed Feb. 26, 2015.

Advisory Action dated Jan. 29, 2016, U.S. Appl. No. 14/632,850, filed Feb. 26, 2015.

(56) References Cited

OTHER PUBLICATIONS

FAIPP Pre-Interview Communication dated May 12, 2014, U.S. Appl. No. 13/294,177, filed Nov. 11, 2011.
Notice of Allowance dated Oct. 8, 2014, U.S. Appl. No. 13/294,177, filed Nov. 11, 2011.
FAIPP Pre-Interview Communication dated Mar. 25, 2015, U.S. Appl. No. 13/532,588, filed Jun. 25, 2012.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012
FAIPP Pre-Interview Communication dated Sep. 25, 2014, U.S. Appl. No. 13/533,969, filed Jun. 27, 2012.
Notice of Allowance dated Feb. 5, 2015, U.S. Appl. No. 13/533,969, filed Jun. 27, 2012.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.
Notice of Allowance dated Jun. 17, 2015, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Mar. 10, 2015, U.S. Appl. No. 13/762,319, filed Feb. 7, 2013.
Notice of Allowance dated Jun. 9, 2015, U.S. Appl. No. 13/762,319, filed Feb. 7, 2013.
Notice of Allowance dated Aug. 30, 2013, U.S. Appl. No. 13/540,437, filed Jul. 2, 2012.
FAIPP Pre-Interview Communication dated May 21, 2015, U.S. Appl. No. 14/090,667, filed Nov. 26, 2013.
Notice of Allowance dated Aug. 4, 2015, U.S. Appl. No. 14/090,667, filed Nov. 26, 2013.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
Notice of Allowance dated Sep. 21, 2015, U.S. Appl. No. 14/148,714, filed Jan. 6, 2014.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Final Office Action dated Apr. 7, 2015, U.S. Appl. No. 13/844,145, filed Mar. 15, 2013.
Notice of Allowance dated Jul. 6, 2015, U.S. Appl. No. 13/844,145, filed Mar. 15, 2013.
FAIPP Pre-Interview Communication dated Mar. 1, 2016, U.S. Appl. No. 13/863,376, filed Apr. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Notice of Allowance dated Jul. 6, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
Notice of Allowance dated Nov. 9, 2015, U.S. Appl. No. 14/659,614, filed Mar. 17, 2015.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Notice of Allowance dated Aug. 14, 2015, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
First Action Interview Office Action dated Apr. 7, 2015, U.S. Appl. No. 13/802,404, filed Mar. 13, 2013.
Final Office Action dated Aug. 27, 2015, U.S. Appl. No. 13/802,404, filed Mar. 13, 2013.
Advisory Action dated Nov. 16, 2015, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Mar. 26, 2015, U.S. Appl. No. 13/939,175, filed Jul. 10, 2013.
Notice of Allowance dated Jul. 7, 2015, U.S. Appl. No. 13/939,175, filed Jul. 10, 2013.
FAIPP Pre-Interview Communication dated Oct. 29, 2014, U.S. Appl. No. 13/844,282, filed Mar. 15, 2013.
Final Office Action dated Mar. 24, 2015, U.S. Appl. No. 13/844,282, filed Mar. 15, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Feb. 26, 2016, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Mar. 24, 2015, U.S. Appl. No. 13/964,112, filed Aug. 12, 2013.

(56) References Cited

OTHER PUBLICATIONS

Notice of Allowance dated Aug. 3, 2015, U.S. Appl. No. 13/964,112, filed Aug. 12, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
FAIPP Pre-Interview Communication dated Feb. 4, 2015, U.S. Appl. No. 14/075,663, filed Nov. 8, 2013.
First Action Interview Office Action dated Apr. 10, 2015, U.S. Appl. No. 14/075,663, filed Nov. 8, 2013.
Notice of Allowance dated Jul. 1, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Notice of Allowance dated Apr. 9, 2015, U.S. Appl. No. 14/163,047, filed Jan. 24, 2014.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Nov. 18, 2015, U.S. Appl. No. 14/681,077, filed Apr. 7, 2015.
FAIPP Pre-Interview Communication dated Aug. 5, 2015, U.S. Appl. No. 13/857,141, filed Apr. 4, 2013.
Notice of Allowance dated Dec. 17, 2015, U.S. Appl. No. 13/857,141, filed Apr. 4, 2013.
Restriction Requirement dated Jan. 5, 2015, U.S. Appl. No. 13/857,139, filed Apr. 4, 2013.
FAIPP Pre-Interview Communication dated Jun. 2, 2015, U.S. Appl. No. 13/857,139, filed Apr. 4, 2013.
Office Action dated Nov. 19, 2015, U.S. Appl. No. 13/857,139, filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Jun. 11, 2015, U.S. Appl. No. 13/857,138, filed Apr. 4, 2013.
FAIPP Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Preliminary Report on Patentability, dated Feb. 5, 2015, PCT/US13/51750, filed on Jul. 24, 2013.
Foreign Communication from a Related Counterpart—International Search Report and Written Opinion, dated Jul. 11, 2014, PCT/US14/16651, filed on Feb. 16, 2014.
Foreign Communication from a Related Counterpart—International Preliminary Report on Patentability, dated Sep. 24, 2015, PCT/US14/16651, filed on Feb. 16, 2014.
Ahmed, Farid, et al., "Correlation-based Watermarking Method for Imagine Authentication Applications", Society of Photo-Optical Instrumentation Engineers, Feb. 17, 2004, pp. 1834-1838.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
LEE, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf
Dietrich, Kurt, et al., "Implementation Aspects of Mobile and Embedded Trusted Computing," Institute for Applied Information Processing and Communications, Trusted Computing Interaction Conference, 2009.
McRoberts, Leo Michael, et al., "End-to-End Trusted Communications Infrastructure," filed Jan. 25, 2016, U.S. Appl. No. 15/005,123.
Bye, Stephen James, et al., "Protection for Multimedia Files Pre-Downloaded to a Mobile Device," filed Apr. 15, 2013, U.S. Appl. No. 13/863,376.
Bertz, Lyle T., et al., "Framework for Real-Time Brokering of Digital Content Delivery," filed Mar. 17, 2015, U.S. Appl. No. 14/659,614.
Paczkowski, Lyle W., et al., "Trusted Security Zone Enhanced with Trusted Hardware Drivers," filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device," filed Mar. 15, 2013, U.S. Appl. No. 13/844,282.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.

(56) References Cited

OTHER PUBLICATIONS

Neson, Tracy L., et al., "Mated Universal Serial Bus (USB) Wireless Dongles Configured with Destination Addresses," filed Jan. 26, 2015, U.S. Appl. No. 14/606,011.
Marquardt, et al., "Infrastructure for Secure Short Message Transmission," filed Apr. 7, 2015, U.S. Appl. No. 14/681,077.
Cordes, Kevin R., et al., "Digest of Biographical Information for an Electronic Device with Static and Dynamic Portions," filed Mar. 14, 2016, U.S. Appl. No. 15/069,921.
Cordes, Kevin R., et al., "Radio Frequency Identity (RFID) Chip Electrically and Communicatively Coupled to Motherboard of Mobile Communication Device,"filed Apr. 4, 2013, U.S. Appl. No. 13/857,139.
Paczkowski, Lyle W., et al., "Trusted Code Generation and Verification to Prevent Fraud from Maleficent External Devices that Capture Data," filed Jan. 14, 2015, U.S. Appl. No. 14/596,218.
European Examination Report dated Jun. 1, 2016, EPC Application Serial No. 14775613.4, filed on Jul. 8, 2015.
Office Action dated Aug. 25, 2016, U.S. Appl. No. 13/860,338, filed Apr. 10, 2013.
Notice of Allowance dated Aug. 24, 2016, U.S. Appl. No. 13/912,190, filed Jun. 6, 2013.
FAIPP Pre-Interview Communication dated Aug. 8, 2016, U.S. Appl. No. 14/596,218, filed Jan. 14, 2015.
Notice of Allowance dated Jun. 15, 2016, U.S. Appl. No. 14/681,077, filed Apr. 7, 2015.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.
Hamdare, Safa, et al., "Securing SMS Based One Time Password Technique from Man in the Middle Attach," IJETT, vol. 11 Issue 3, May 2014.
Notice of Allowance dated Sep. 20, 2016, U.S. Appl. No. 14/703,885, filed May 5, 2015.
Foreign Communication from a Related Counterpart—International Search Report and Written Opinion dated Oct. 21, 2016, filed on Aug. 11, 2016, International Application No. PCT/US2016/046648.
Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.
Marquardt, Ronald ft, et al., "System and Method for Trusted Operability When Moving Between Network Functions Virtualization States," filed on Aug. 11, 2016, International Application No. PCT/US2016/046648.
Bales, Mark R., et al., "Session Aggregator Brokering of Data Stream Communication," filed on Oct. 3, 2016, U.S. Appl. No. 15/284,506.
Examinees Answer dated Nov. 16, 2016, U.S. Appl. No. 14/632,850, filed Feb. 26, 2015.
Notice of Allowance dated Nov. 18, 2016, U.S. Appl. No. 13/802,404, filed Mar. 13, 2013.
FAIPP Pre-Interview Communication dated Oct. 5, 2016, U.S. Appl. No. 15/069,921, filed Mar. 14, 2016.
McCracken, Billy Gene, Jr., et al. "Mobile Communication Device Profound Identity Brokering Framework", filed Nov. 30, 2016, U.S. Appl. No. 15/365,934.

* cited by examiner

TRUSTED SIGNALING IN 3GPP INTERFACES IN A NETWORK FUNCTION VIRTUALIZATION WIRELESS COMMUNICATION SYSTEM

CROSS-REFERENCE TO RELATED APPLICATIONS

This is a continuation-in-part (CIP) Patent Application claiming priority to U.S. patent application Ser. No. 13/762,319, filed Mar. 7, 2013, entitled "Trusted Signaling in Long Term Evolution (LTE) 4G Wireless Communication," by Stephen J. Bye, et al., which is herein incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information.

SUMMARY

In an embodiment, a method of wireless communication enabled by hardware assisted security is disclosed. The method comprises receiving a trusted communication request from an enhanced node B (eNB) by a serving gateway interface application, where the serving gateway interface application is part of a serving gateway virtualized network function provided by a virtual server executing in a virtual computing environment and determining by a security monitor module of the serving gateway virtualized network function that a trusted communication request has been received, where the security monitor executes in a trusted security zone of compute resources provided by the virtual computing environment and wherein the trusted security zone provides hardware assisted security. The method further comprises allocating a serving gateway interface trustlet by the security monitor to handle the trusted communication request of the enhanced node B, where the serving gateway interface trustlet executes in the trusted security zone, is associated with the serving gateway interface application, and is part of the serving gateway virtualized network function and establishing trusted signaling by the serving gateway interface trustlet with two or more mobility management entity (MME), home subscriber server (HSS), policy and charging rules function (PCRF) server virtualized network functions provided by virtual servers executing in the virtual computing environment. The method further comprises sending a trust token by the serving gateway interface trustlet to the eNB, whereby a trusted communication link from the eNB is established via a virtualized network function path through the virtual computing environment.

In another embodiment, a method of wireless communication enabled by hardware assisted security is disclosed. The method comprises receiving a trusted communication request from an enhanced node B (eNB) by a mobility management entity (MME) interface application, where the MME interface application is part of an MME virtualized network function provided by a virtual server executing in a virtual computing environment and allocating an MME interface trustlet to the enhanced node B that requested the trusted communication, where the MME interface trustlet executes in a trusted security zone of compute resources provided by the virtual computing environment, is associated with the MME interface application, and is part of the MME virtualized network function. The method further comprises establishing trusted signaling by the MME interface trustlet with two or more serving gateway, home subscriber server (HSS), policy and charging rules function (PCRF) server virtualized network functions provided by virtual servers executing in the virtual computing environment and sending a trust token by the MME interface trustlet to the eNB, whereby a trusted communication link from the eNB is established via a virtualized network function path through the virtual computing environment.

In another embodiment, a method of wireless communication enabled by hardware assisted security is disclosed. The method comprises receiving a trusted communication request from an enhanced node B (eNB) by a serving gateway interface application, where the serving gateway interface application is part of a serving gateway virtualized network function provided by a virtual server executing in a virtual computing environment and allocating a serving gateway interface trustlet to the enhanced node B that requested the trusted communication, where the serving gateway interface trustlet executes in a trusted security zone of compute resources provided by the virtual computing environment, is associated with the serving gateway interface application, and is part of the serving gateway virtualized network function. The method further comprises establishing trusted signaling by the serving gateway interface trustlet with two or more mobility management entity (MME), home subscriber server (HSS), policy and charging rules function (PCRF) server virtualized network functions provided by virtual servers executing in the virtual computing environment and sending a trust token by the serving gateway interface trustlet to the eNB, whereby a trusted communication link from the eNB is established via a virtualized network function path through the virtual computing environment.

In another embodiment, a method of wireless communication enabled by hardware assisted trust is disclosed. The method comprises receiving a trust zone request by an enhanced node B from an electronic device attached to a long term evolution (LTE) wireless network and forwarding the trust zone request from the enhanced node B to a home subscription server (HSS), wherein the enhanced node B forwards the trust zone request while executing in a trust zone of the enhanced node B, wherein the trust zone provides hardware assisted trust. The method further comprises receiving a trust zone request acknowledgement by the enhanced node B from the home subscription server while executing in the trust zone of the enhanced node B, forwarding the trust zone request acknowledgement by the enhanced node B to the electronic device, wherein the enhanced node B forwards the trust zone acknowledgement while executing in the trust zone of the enhanced node B, and receiving a trusted service request by the enhanced node B from the electronic device. The method further comprises forwarding the trusted service request by the enhanced node B to a policy and charging rules function (PCRF) server, wherein the enhanced node B forwards the trusted service request while executing in the trust zone of the enhanced node B, receiving a trusted service request acknowledgement by the enhanced node B from the policy and charging rules function server while executing in the trust zone of the enhanced node B, and forwarding the trusted service request acknowledgement to the electronic device, whereby the electronic device is provided a trusted bearer communication link.

In another embodiment, a method of wireless communication enabled by hardware assisted trust is disclosed. The method comprises attaching a mobile communication device by an enhanced node B to a long term evolution (LTE) wireless network, performing signaling on behalf of the mobile communication device to establish a trusted bearer communication link between the mobile communication device and the long term evolution wireless network, and receiving a trusted service termination request by the enhanced node B from the mobile communication device while executing in a trust zone of the enhanced node B. The method further comprises forwarding the trusted service termination request by the enhanced node B while executing in the trust zone of the enhanced node B to at least one of a mobility management entity (MME), a home subscriber server (HSS), a packet gateway (P-GW), and a policy and charging rules function (PCRF) server, receiving a trusted service termination acknowledgment by the enhanced node B while executing in the trust zone of the enhanced node B, and forwarding the trusted service termination acknowledgment by the enhanced node B while executing in the trust zone of the enhanced node B, whereby the trusted bearer communication link from the mobile communication device and the long term evolution wireless network is taken down.

In another embodiment, a method of wireless communication enabled by hardware assisted trust is disclosed. The method comprises attaching a mobile communication device by a first enhanced node B to a first long term evolution (LTE) wireless network, performing signaling on behalf of the mobile communication device to establish a trusted bearer communication link between the mobile communication device and the first long term evolution wireless network, and transmitting a redirect request by the first enhanced node B to a mobility management entity (MME). The method further comprises analyzing by the mobility management entity a signaling trust continuum in a second long term evolution wireless network, and performing signaling on behalf of the mobile communication device to establish a trusted bearer communication link between the mobile communication device and the second long term evolution wireless network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
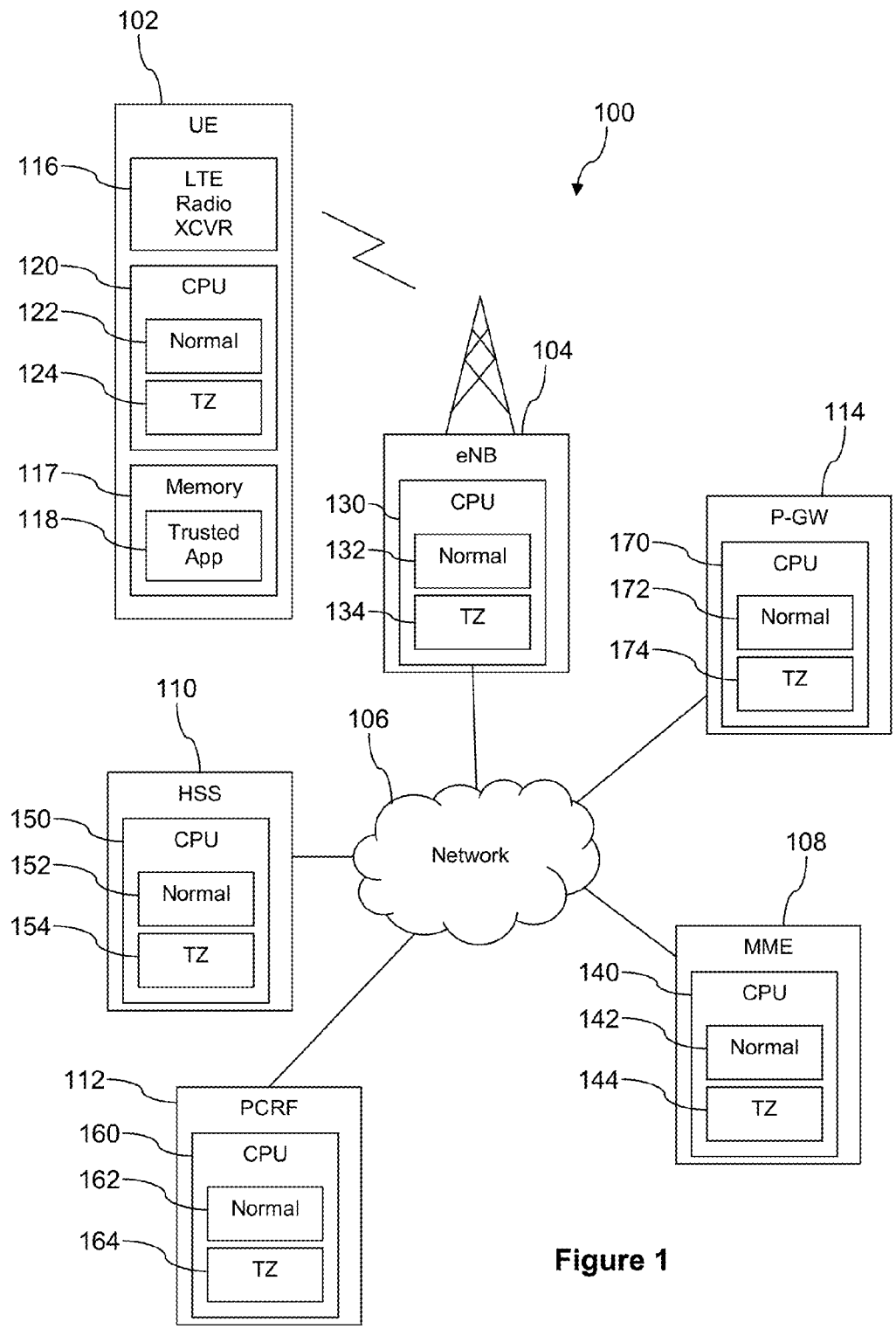
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, some of a communication network's functionality may be provided with a network function virtualization (NFV) communication paradigm. For example, the functionality of a home subscriber server, a mobility management entity, a policy and charging rules function node, and a serving gateway—rather than each being provided by separate computers or computer systems—may be provided by virtual servers executing in a virtual computing environment, for example executing in a cloud computing environment. Further, the network functions may be composed of common functions. For example, a mobility management entity network function may be composed of a network attach function, an authentication function, a mobility function, a context function, and other functions. A home subscriber server network function may be composed of the attach function and the authentication function. In an embodiment, common functions are executed in one or more virtual servers executing in a virtual computing environment. Then when a first network function is performed, the sequence of operations associated with the first network function are performed by the several engaged common network functions executing in different virtual servers. And when a different second network function is performed, the sequence of operations associated with the second network function is performed, in part, by one of the common network functions used by the first network function. The common function processing may be performed by the same virtual server instance that handles the processing of the common function for the first network function. This may be referred to as factorizing the common functions.

The factorization of common functions in combination with virtualized execution can provide a variety of advantages to a wireless communication service provider. This paradigm provides the ability to conveniently and quickly expand or contract compute resources as needed. This paradigm allows a wireless communication service provider to pay for compute resources as they are used, on an as needed basis, versus investing significant capital in purchasing and installing computing equipment in anticipation of future needs, needs which may not materialize or may not be as large (or as small!) as projected. Virtualization of common network functions and network function virtualization is described further hereinafter.

Virtual servers execute on compute resources. The physical details of the compute resources may be abstracted so a virtual server only interacts with a logical view of the underlying compute resources, thereby decoupling the virtual servers from the physical details of the compute resources. Decoupling the virtual servers from the physical details of the underlying compute resources may make instantiating the virtual server on different physical compute resources more convenient and may entail less system administrator intervention. A virtual server may execute in the context of or under the management of a hypervisor or may execute in the context of a logical operating system that abstracts away the physical details of the underlying compute resources. Compute resources comprise the customary computer system components: processors, main memory (e.g., semiconductor RAM), secondary memory or mass memory (e.g., disk drives), and network interfaces. Compute resources may also comprise trusted security zone resources.

A virtual computing environment operating system or the virtual server may incorporate support for trusted execution of logic and/or instructions (e.g., execution of the instructions in a trusted security zone). An application may be partitioned into a portion comprised of instructions that need not execute in the trusted security zone and a portion comprised of instructions that desirably do execute in the trusted security zone. The portion of instructions of an application that are desirably executed in the trusted security zone may be referred to as a trustlet. A trustlet may be thought of as an extract of a complete application—an extract of the specific instructions that desirably execute in a trusted security zone. The portion of the application that need not execute in the trusted security zone may be said to execute in the rich environment or permissive environment.

Some of the common functions of the network functions may be composed of a portion that executes in the rich environment and a trustlet that executes in the trusted security zone. When a request for trusted communication is received in the communication network the processing provided by some common functions (e.g., the policy function, the context function, a bearer function, etc.), the processing of that common function passes to the trustlet of that common function. The trustlet is instantiated to execute in a trusted security zone provided by the compute resources underlying the virtual server in which the subject common function and trustlet execute.

In an embodiment, a security monitor component executing on the virtual server determines that a request for trusted communication has been received and passes control to the trustlet. The security monitor may periodically poll the portion of the common function that executes in the rich environment. If a request is pending, the security monitor may retrieve some communication parameters that may be used by the trustlet to continue on with trusted communication with the requesting communication node (e.g., the enhanced node B). The communication interface between the security monitor and the portion of the common function executing in the rich environment is very lean to reduce the opportunity for corrupting the protections of trusted execution. For example, the parameters that the portion of the common function executing in the rich environment can pass in response to the security monitor's request may be strictly limited. When the trusted communication session is over, the security monitor may cause the portion of the common function to resume executing in the rich environment. In an embodiment, the security monitor may be a process that is part of the operating system on the compute resources. The security monitor may pause or stop the execution of the portion of the common application that executes in the rich environment or remove it from the scheduling sequence temporarily. The security monitor may pause or stop the execution of other processes in the rich environment when the trustlet is executing.

In an embodiment, some of the interfaces among the network functions may be changed as a result of the factorization of network functions into common functions. At the same time, some others of the interfaces may desirably remain unchanged, in order to maintain compatibility with external communication nodes (nodes outside of the network function virtualization computing environment, for example the enhanced node B). These may be referred to as 3GPP interfaces. Some examples of these outward facing interfaces are the S1 interface (S1-U, S1-C, etc.), the SGi interface, and the Rx interface. To provide for trusted communication between the enhanced node B and the network function virtualization system, the S1 interface is provided as part of a common function and is supported both by a portion of instructions that execute in the rich environment and a trustlet to support trusted communication from the enhanced node B.

Further, according to a more traditional communication network (e.g., not based on a network function virtualization paradigm), a system for trusted signaling in a long term evolution (LTE) wireless communication network is taught. Signaling among long term evolution (LTE) network nodes may be performed to establish a bearer channel between a wireless communication device, herein after referred to as a user equipment (UE), and other communication devices such as another user equipment or an application server. When a user equipment desires to execute a trusted network application over the communication network or to conduct other trusted communications over the communication network, a trusted bearer path may desirably be created to promote a continuity of trust between the user equipment and a communication end point, for example a trusted application server. As described in more detail below, trusted computation and/or trusted communication is based on hardware assisted security that reduces the ability of nefarious software or corrupt devices to write, read, or otherwise access trusted processing or trusted messages. For further details about creating a trusted bearer path, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety.

To provide trusted communications, however, the signaling that sets up the trusted bearer communication path may likewise desirably be conducted using a trusted signaling communication path. In an embodiment, a user equipment that is attached to the LTE network may execute a trusted application that executes some instructions in a trusted security zone of the processor of the user equipment. In some contexts herein a trusted security zone may be referred to as a trust zone and/or as a trusted zone. While executing in the trust zone, the trusted application may send a trust zone request to a home subscriber server (HSS) to receive a trust acknowledgement and one or more user parameters associated with the subject trusted application. The trust zone request may be received by an enhanced node B (eNB) or cell tower. The enhanced node B may handle the trust zone request by executing in a trust zone of the enhanced node B processor to send the trust zone request on to a mobility management entity (MME) or other signaling node in the LTE network. The mobility management entity may handle the trust zone request by executing in a trust zone of the mobility management entity processor to send the trust zone request on to the home subscriber server. The home subscriber server may handle the trust zone request by executing in a trust zone of the home subscriber server and sending a trust zone acknowledgment and optional use parameters back to the user equipment.

In an embodiment, the home subscriber server confirms that the user equipment has rights to execute a trusted service request before generating and sending the trust zone acknowledgment. For example, the home subscriber server may determine if the user equipment is subscribed to at least one trusted network application. For example, the home subscriber server may determine if the subscriber associated with the user equipment is deemed a trust worthy subscriber, for example whether the subscriber has a pending unresolved security or trust violation event history.

The user parameters may be parameters related to the trusted network application or other trusted communication that the user equipment is requesting. The user parameters may be credentials or tokens used to invoke methods or functions of an application programming interface (API) provided by a trusted network application server. The user parameters may identify data that the user equipment should provide to receive access to the requested trusted service or trusted communication. The user parameters may define a level of access to one or more trusted network applications to which the user equipment is allowed. The user parameters may define a biometric signature, a format of a biometric signature, and/or an encoding method of a biometric signature.

After trust zone processing is established in the signaling path to which it is attached, the user equipment may send a trusted service request from its trust zone to a policy and charging rules function (PCRF) node. It is understood that the trusted service request may be transported by a plurality of nodes in the long term evolution network, each handling the trusted service request in a trust zone of their processor, for example the enhanced node B, the mobility management entity, the home subscriber server, and possibly other nodes. The policy and charging rules function node determines if the trusted service request meets the standards of a trusted communication and if the user equipment has rights to execute the requested trusted service. If the trusted service request is authorized, the policy and charging rules function node sends a trusted service acknowledge and optional use parameters over the signaling path to the user equipment. Said in other words, the policy and charging rules function confirms that a policy allows the user equipment to invoke the requested trusted service request before generating and sending the trusted service acknowledgment. Again, the trusted service acknowledgement and optional use parameters are transported by nodes executing in a trust zone of their processors. In an embodiment, the trusted service acknowledgement comprises trusted bearer communication link path information to support establishing and/or setting up the trusted bearer path. The trusted bearer path or trusted bearer channel is then activated, and the user equipment accesses the subject trusted services via the trusted bearer path.

When it has completed its access to the trusted service, the user equipment may send a trust termination request to the policy and charging rules function node, and the policy and charging rules function node may send a trust termination acknowledge back to the user equipment. The user equipment may then send an exit trust zone command to the enhanced node B while executing in the trust zone of the user equipment processor. After having sent the exit trust zone command, the user equipment may exit trust zone processing. The enhanced node B may then forward the exit trust zone command to the mobility management entity while executing in the trust zone of the enhanced node B processor. After having forwarded the exit trust zone command, the enhanced node B may exit trust zone processing. The mobility management entity may then forward the exit trust zone command to the home subscriber server while executing in the trust zone of the mobility management entity processor. After having forwarded the exit trust zone command, the mobility management entity may exit trust zone processing. The home subscriber server may then forward the exit trust zone command to the policy and charging rules function node while executing in the trust zone of the home subscriber server processor. After having forwarded the exit trust zone command, the home subscriber server may exit trust zone processing. The policy and charging rules function node may forward the exit trust zone command to a packet gateway while executing in the trust zone of the policy and charging rules function node. After having forwarded the exit trust zone command, the policy and charging rules function node may exit trust zone processing.

When it receives the exit trust zone command, the packet gateway may first mediate the tearing down of the trusted bearer path and then exit trust zone processing. Alternatively, other nodes in the trusted signaling path may control or mediate the tearing down of the trusted bearer path, for example before they exit processing in their trust zone. At this point in time, the trusted bearer path has been taken down. After the trusted bearer path has been taken down and after signaling returns to normal signaling, a normal bearer channel may be activated or brought up.

In an embodiment, the user equipment may have a need during a trusted communication session using a trusted bearer path to enter or obtain communication services from a foreign network (here the term "foreign network" is used to indicate a wireless communication network other than the primary network to which the user equipment has subscribed service). The user equipment may send a redirect request from its trust zone to the mobility management entity. The mobility management entity may probe the signaling endpoint in the foreign network to determine if the foreign network can support a trusted signaling path and a trusted bearer path to provide the requested end-to-end trusted communication bearer path. If the foreign network can support these trust needs, the trusted bearer channel is bridged into the foreign network where an end-to-end trusted bearer path is likewise provided to the user equipment.

A trusted security zone provides chipsets with a hardware root of trust, a secure execution environment for applications, and secure access to peripherals. A hardware root of trust means the chipset should only execute programs intended by the device manufacturer or vendor and resist software and physical attacks, and therefore remain trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust records, trust tokens, and/or trust symbols may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a wireless communication system 100 is described. In an embodiment, the system 100 comprises a user equipment (UE) 102, an enhanced node B (eNB) 104, a network 106, a mobility management entity (MME) 108, a home subscriber server (HSS) 110, a policy and charging rules function (PCRF) 112, and a packet gateway (P-GW) 114. User equipment (UE) 102 may also be referred to herein as a "mobile communication device" or "mobile device". In an embodiment, the system 100 may further comprise other signaling nodes, for example a signaling gateway (S-GW). In some embodiments, the packet gateway 114 and signaling gateway may be combined in one platform or server and may be referred to as a serving gateway 114. In an embodiment, these devices may form a portion of a long term evolution (LTE) wireless network. In some contexts, the long term evolution wireless network may be referred to as a fourth generation or a 4G wireless network. It is understood that the system 100 may comprise any number of the devices 102, 104, 108, 110, 112, and 114. The network 106 comprises one or more public communication networks, one or more private communication networks, or a combination thereof. While in a preferred embodiment, the enhanced node B establishes wireless communication links with the UE 102 according to a long term evolution wireless communication protocol, in some embodiments the enhanced node B 104 may establish wireless communication links with the UE 102 according to at least one of a code division multiple access (CDMA), a global system for mobile communications (GSM), or a worldwide interoperability for microwave access (WiMAX) wireless communication protocol.

While the mobility management entity 108, the home subscriber server 110, the policy and charging rules function 112, and the packet gateway 114 may normally be considered to form a part of the network 106, they are shown outside of the "cloud" representing the network 106 to promote ease of description of the teachings of the present disclosure. The enhanced node B 104, the mobility management entity 108, the home subscriber server 110, the policy and charging rules function 112, and the packet gateway 114 may be implemented on computers. Computers are described in more detail hereinafter. While shown as separate entities, two or more of the mobility management entity 108, the home subscriber server 110, the policy and charging rules function 112, and the packet gateway 114 may be combined on one computer or one computer system. In an embodiment, the functionality associated with the MME 108, the HSS 110, the PCRF 112, and the P-GW 114 may be provided as virtualized network functions in a cloud computing environment as discussed further hereinafter. This may be referred to as a network function virtualization (NFV) communication paradigm.

The UE 102 may be a mobile phone, a personal digital assistant (PDA), a media player, or a wireless communication enabled computer, for example a long term evolution wireless communication enabled computer. The UE 102 may comprise a long term evolution radio transceiver 116, a memory 117, a trusted application 118, and a processor 120. The trusted application 118 may be stored in the memory 117 and executed by the processor 120. The processor 120 comprises a normal portion 122 and a trust zone portion 124. When the trusted application 118 is executed by the processor 120, at least some of the instructions of the trusted application 118 are executed in the trust zone 124 of the processor 120. Trust zones and trusted execution environments are discussed in more detail above. The trust zone 124 provides hardware assisted security for processing that is deemed sensitive, for example processing that involves confidential personal and/or financial information.

The enhanced node B 104 comprises a processor 130 that comprises a normal portion 132 and a trust zone portion 134. The mobility management entity 108 comprises a processor 140 that comprises a normal portion 142 and a trust zone portion 144. The home subscriber server 110 comprises a processor 150 that comprises a normal portion 152 and a trust zone portion 154. The policy and charging rules function 112 comprises a processor 160 that comprises a normal portion 162 and a trust zone portion 164. The packet gateway 114 comprises a processor 170 that comprises a normal portion 172 and a trust zone portion 174. A variety of different trusted signaling scenarios may be executed in the process of setting-up and tearing down the trusted bearer path. Some of these trusted signaling scenarios are discussed in detail below with reference to message sequence diagrams depicted in FIG. 3, FIG. 4, FIG. 5, and FIG. 6.

Figure 2:
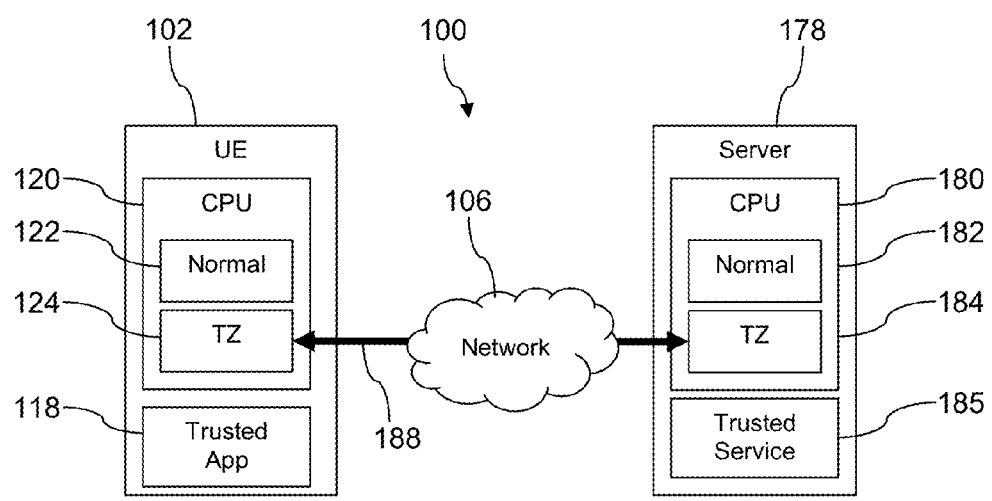
FIG. 2 is a further illustration of another aspect of the communication according to an embodiment of the disclosure.

Turning now to FIG. 2, a further portion of the wireless communication system 100 is illustrated. The UE 102 is illustrated as communicating with a server computer 178 via a trusted bearer 188. The server 178 comprises a processor 180 that comprises a normal portion 182 and a trust zone portion 184. Under this circumstance, the trust zone 124 of the UE 102 is communicating with the trust zone 184 of the server 178 via the network 106 via the bearer path 188 having continuity of trust.

The trusted communication may involve transport over the trusted bearer 188 of sensitive confidential or financial information. For example, the UE 102 may be sending and/or receiving sensitive health records, medical reports, or biometric data over the trusted bearer 188 to a trusted service 185 executing on the server 178. In an embodiment, the server may be executing a trusted medical records application that stores the transmitted information in a data store and/or retrieves medical records information from a data store. The UE 102 may be embedded in a home medical apparatus such as a blood sugar level testing device used in a home by a diabetic patient under remote medical supervision. The UE 102 may transmit current blood sugar level readings linked to an identity of the diabetic patient over the trusted bearer 188 to the server 178. In an embodiment, the home medical apparatus may prompt the user to provide a biometric signature that will be coupled to the sensor information to confirm the linkage of the sensed information with the user, for example to prevent fraud or to provide identification assurance. The biometric signature may be an encoded finger print provided by a fingerprint scanner coupled to the home medical apparatus. The biometric signature may be an encoded retina scan provided by a retina scanner coupled to the home medical apparatus. The biometric signature may be related to some other biological parameter or profile of the subject user. It is contemplated that the system 100 may be used to perform signaling to establish a trusted bearer path suitable for transporting or otherwise communicating a wide variety of sensitive information.

The UE 102 conducts some communications using a trusted communication bearer, for example a bearer path provided over a trusted end-to-end communication infrastructure. For more details on a trusted end-to-end communication infrastructure, see U.S. patent application Ser. No. 13/532,588, filed Jun. 25, 2012, entitled "End-to-end Trusted Communications Infrastructure," by Leo Michael McRoberts, et al., which was incorporated by reference above. As taught herein, trusted signaling may be employed to set-up or to initiate the trusted bearer path. The trusted signaling may involve the UE 102, the enhanced node B 104, the mobility management entity 108, the home subscriber server 110, the policy and charging rules function 112, and/or the packet gateway 114 executing at least some instructions for signaling in their trust zones 124, 134, 144, 154, 164, and/or 174.

Figure 3:
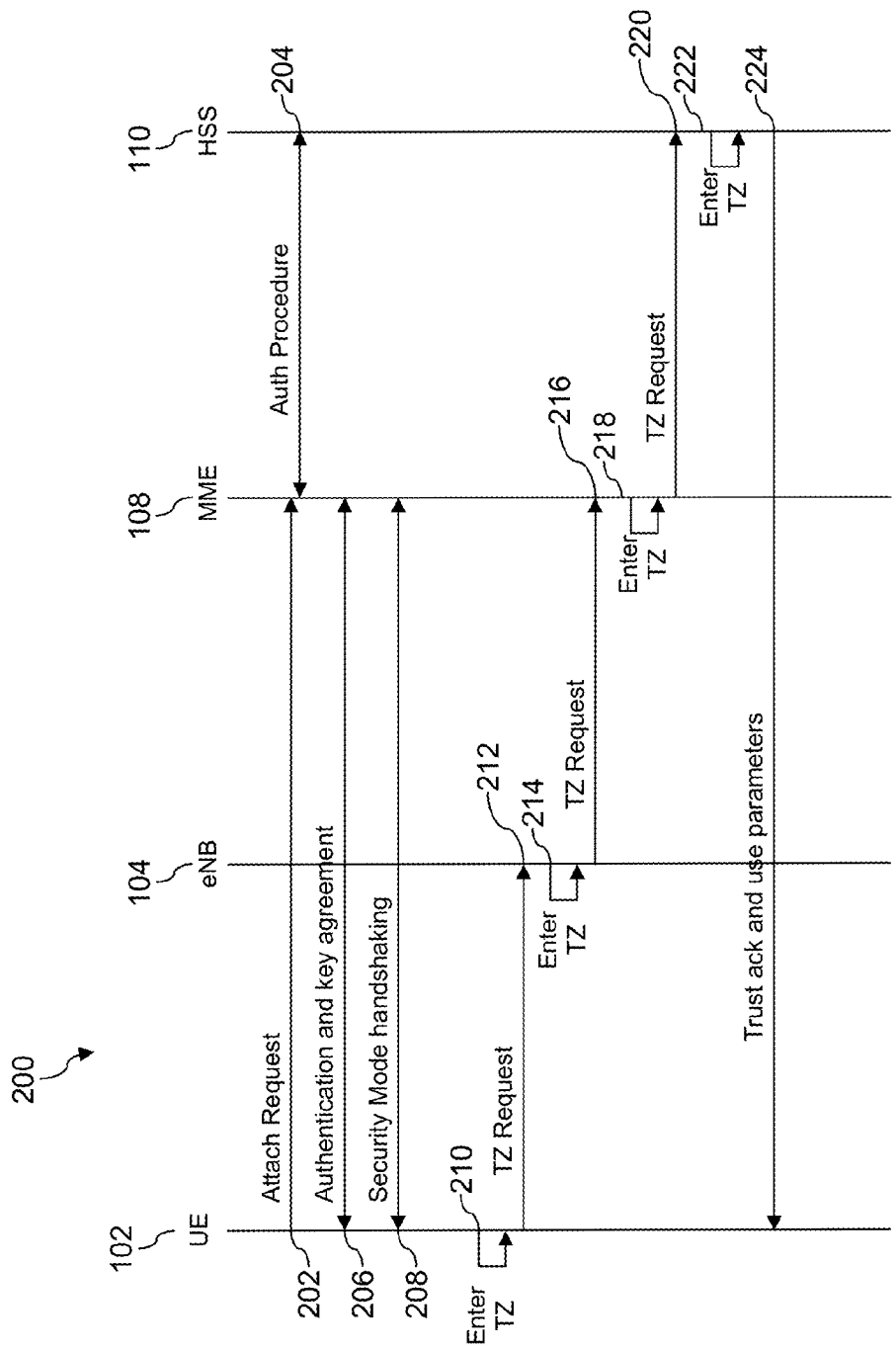
FIG. 3 is a message sequence diagram according to an embodiment of the disclosure.

Turning now to FIG. 3, a message sequence 200 is described. In an embodiment, the message sequence 200 may be performed when the UE 102 initially attaches to a long term evolution network, such as the network 106 illustrated in and described with reference to FIG. 1. The UE 102 sends an attach request 202 to the mobility management entity 108 via the enhanced node B 104. In response to receiving the attach request 202, the mobility management entity 108 conducts an authentication procedure 204 with the home subscriber server 110. It is understood that the authentication procedure 204 may entail one or more messages sent both to and from each of the mobility management entity 108 and the home subscriber server 110. On completion of the authentication procedure 204, the mobility management entity 108 conducts an authentication and key agreement procedure with the UE 102 via the enhanced node B 104. It is understood that the authentication and key agreement procedure 206 may entail one or more messages sent both to and from each of the mobility management entity 108 and the UE 102. At some later time, the UE 102 and the mobility management entity 108 may conduct security mode handshaking 208 that is not directly related to trusted signaling and may be pursuant to long term evolution wireless attachment procedures.

At some time, the UE 102 may wish to establish its potential for conducting trusted signaling and/or trusted bearer communications. Said in another way, at some indeterminate time but before initiating trusted signaling and/or trusted bearer communications, the UE 102 may wish to register with one or more nodes in the long term evolution wireless network as a UE capable of engaging in trusted communications. The UE 102 begins processing in its trust zone 124 at label 210. The trust zone 124 of the UE 102 sends a trust zone request 212 to the enhanced node B 104. The enhanced node B 104, in response to receiving the trust zone request 212, first begins processing in its trust zone 134 at label 214, and then the trust zone 134 of the enhanced node B 104 sends a trust zone request 216 to the mobility management entity 108. The mobility management entity 108, in response to receiving the trust zone request 216, first begins processing in its trust zone 144 at label 218, and then the trust zone 144 of the mobility management entity 108 sends a trust zone request 220 to the home subscriber server 110. The home subscriber server 110, in response to receiving the trust zone request 220, begins processing in its trust zone 154 at label 222. The home subscriber server 110 optionally determines use parameters and then sends a trust acknowledge message 224 optionally containing the use parameters back to the trust zone 124 of the UE 102 via the trust zone 144 of the mobility management entity 108 and the trust zone 134 of the enhanced node B 104.

Figure 4:
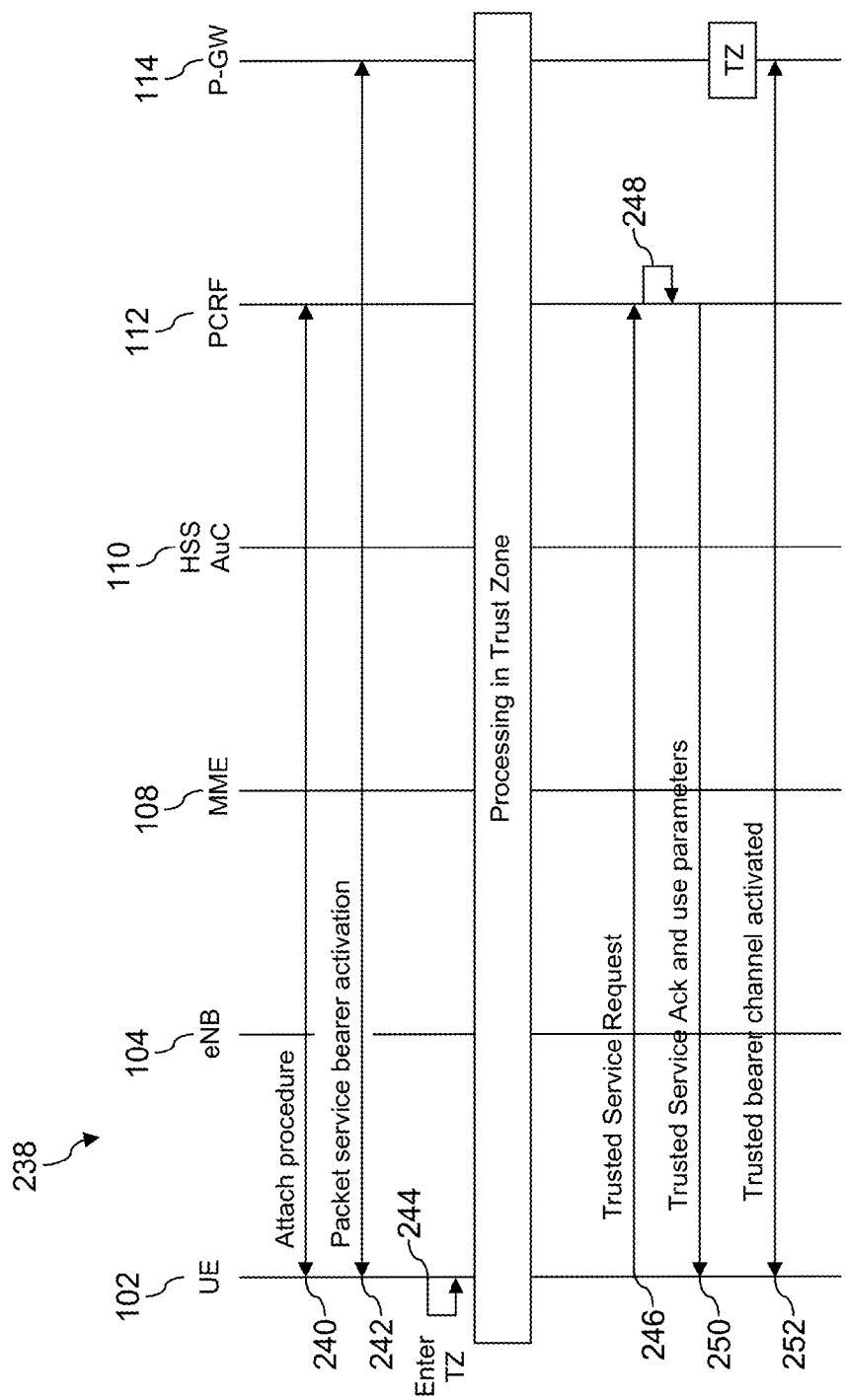
FIG. 4 is another message sequence diagram according to an embodiment of the disclosure.

Turning now to FIG. 4, a message sequence 238 is described. In an embodiment, the message sequence 238 may be performed when the UE 102 desires to engage in trusted communication over a trusted bearer path. The message sequence 238 represents exemplary signaling that the UE 102 may engage in to request the long term evolution wireless network to provide a trusted bearer path. At label 240, the UE 102 attaches to the long term evolution wireless network by messaging with the policy and charging rules function 112 via the enhanced node B 104, the mobility management entity 108, and the home subscriber server 110 (AuC function). At label 242 the UE 102 completes a packet service bearer activation procedure by messaging with the packet gateway 114 via the enhanced node B 104, the mobility management entity 108, the home subscriber server 110 (AuC function), and the policy and charging rules function 112. The processing associated with labels 240 and 242 may be conventional and promote conventional untrusted bearer communication via the long term evolution wireless network on the part of the UE 102.

At some time, the UE 102 may wish to communicate using a trusted bearer path. For example, the UE 102 may be embedded in a home medical apparatus and may desire to invoke a trusted network application executing on the server 178 to transmit and/or store medical sensor information in a data store coupled to the server 178. At label 244, the UE 102 begins processing in its trust zone 124 at label 244. In a message sequence similar to that described above with respect to FIG. 3, the UE 102 requests the enhanced node B 104 to execute in its trust zone 134, the mobility management entity 108 to execute in its trust zone 144, the home subscriber server 110 to execute in its trust zone 154, the policy and charging rules function 112 to execute in its trust zone 164, and the packet gateway 114 to execute in its trust zone 174. The condition where these several nodes are executing in their trust zones is indicated by the box containing the text "processing in trust zone." It is understood that the messages and/or procedures illustrated below this box containing the text "processing in trust zone" are conducted in the several trust zones of the subject network nodes and the UE 102. The UE 102 sends a trusted service request 246 to the policy and charging rules function 112 via the enhanced node B 104, the mobility management entity 108, and the home subscriber server 110. The policy and charging rules function 112 processes the trusted service request 246 at label 248, optionally determining use parameters. The policy and charging rules function 112 then sends a trusted service acknowledgement message 250 that optionally contains use parameters back to the UE 102 via the home subscriber server 110, the mobility management entity 108, and the enhanced node B 104.

At label 252, a trusted bearer channel is activated between the UE 102 and the packet gateway 114. It is understood that the radio link between the UE 102 and the enhanced node B 104 may be the first segment of the trusted bearer path. The packet gateway 114 may execute in its trust zone 174 to connect the UE 102 to a trusted end-to-end communication infrastructure. Said in another way, the packet gateway 114 may execute in its trust zone 174 to connect the UE 102 to a trusted bearer path and/or to provide a bearer path providing a continuity of trust, for example to connect the UE 102 to the server 178 via the trusted bearer path 188.

Figure 5:
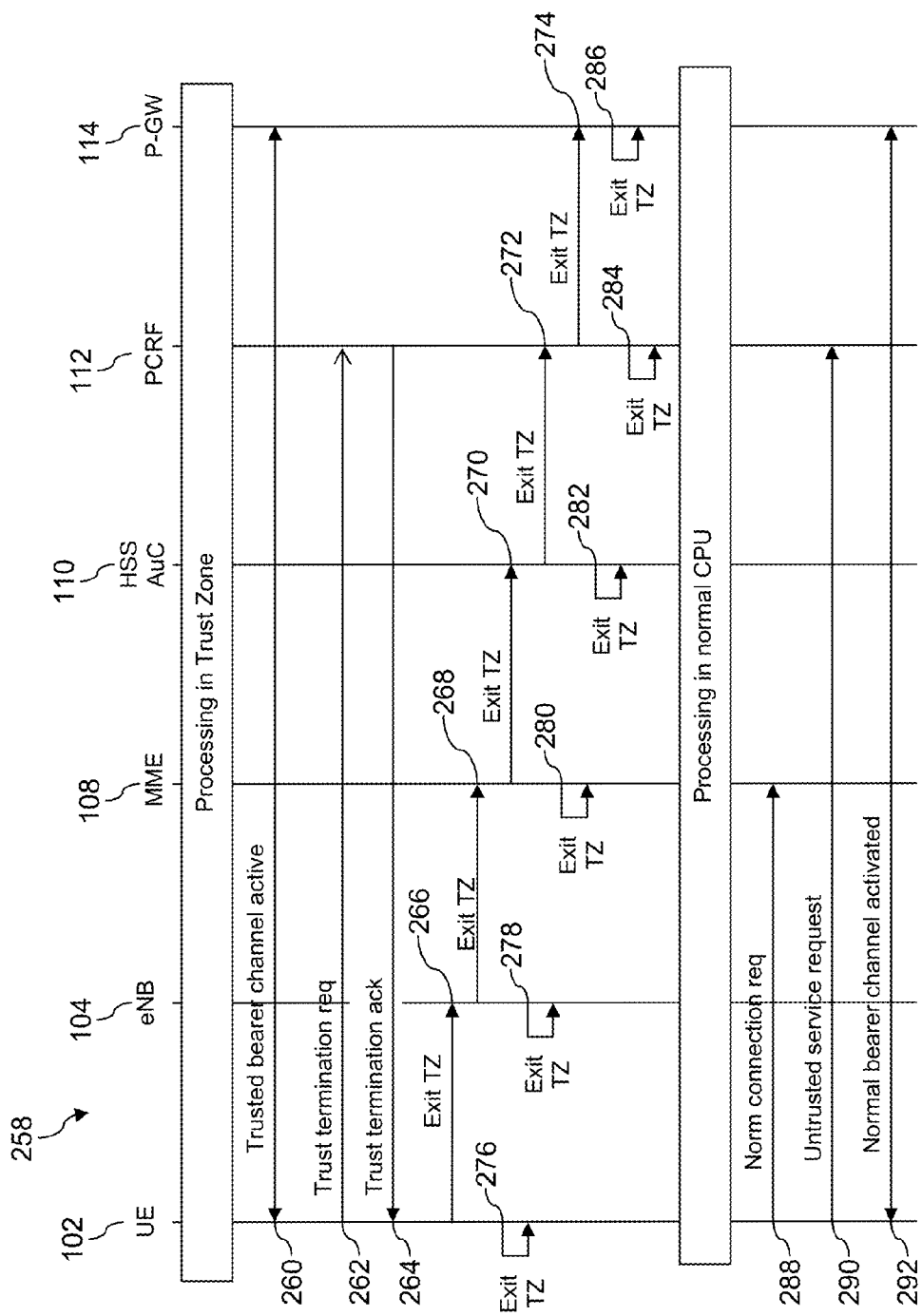
FIG. 5 is another message sequence diagram according to an embodiment of the disclosure.

Turning now to FIG. 5, a message sequence 258 is described. In an embodiment, the message sequence 258 may be performed when the UE 102 desires to discontinue trusted communication over the trusted bearer path and resume communication over a normal bearer path or over an untrusted bearer path. The UE 102 may prefer to conduct normal communications over a normal bearer path or over an untrusted bearer path because the normal bearer path may provide higher throughput rates or because communicating over the normal bearer path may be associated with a more economical rating and/or billing schedule.

The label 260 represents a trusted bearer channel and/or trusted bearer path is provided to the UE 102. The UE 102 sends a trust termination request 262 to the policy and charging rules function 112 via the enhanced node B 104, the mobility management entity 108, and the home subscriber server 110. The policy and charging rules function 112 sends a trust termination acknowledgement 264 to the UE 102 via the home subscriber server 110, the mobility management entity 108, and the enhanced node B 104.

In response to receiving the trust termination acknowledgement 264, the UE 102 first sends an exit trust zone request 266 to the enhanced node B 104 and then at label 276 exits processing in its trust zone 124 and begins processing in its normal portion 122. In response to receiving the exit trust zone request 266, the enhanced node B 104 first sends an exit trust zone request 268 to the mobility management entity 108 and then at label 278 exits processing in its trust zone 134 and begins processing in its normal portion 134. In response to receiving the exit trust zone request 268, the mobility management entity 108 first sends an exit trust zone request 270 to the home subscriber server 110 and then at label 280 exits processing in its trust zone 144 and begins processing in its normal portion 142. In response to receiving the exit trust zone request 270, the home subscriber server 110 first sends an exit trust zone request 272 to the policy and charging rules function 112 and then at label 282 exits processing in its trust zone 154 and begins processing in its normal portion 152. In response to receiving the exit trust zone request 272, the policy and charging rules function 112 first sends an exit trust zone request 274 to the packet gateway 114 and then at label 284 exits processing in its trust zone 164 and begins processing in its normal portion 162. In response to receiving the exit trust zone request 274, the packet gateway 114 first mediates tearing down the trusted bearer path and then at label 286 exits processing in its trust zone 174 and begins processing in its normal portion 172. Alternatively, other nodes in the trusted signaling path may mediate and/or control the tearing down of the trusted bearer path. The box containing the text "processing in normal CPU" represents all of the nodes and the UE 102 processing in their normal portions.

At label 288, the UE 102 may send a normal connection request to the mobility management entity 108 via the enhanced node B 104. At label 290, the UE 102 may send an untrusted service request to the policy and charging rules function 112 via the enhanced node B 104, the mobility management entity 108, and the home subscriber server 110. At label 292, the UE 102 may communicate via a normal bearer channel via the enhanced node B 104 and the packet gateway 114.

Figure 6:
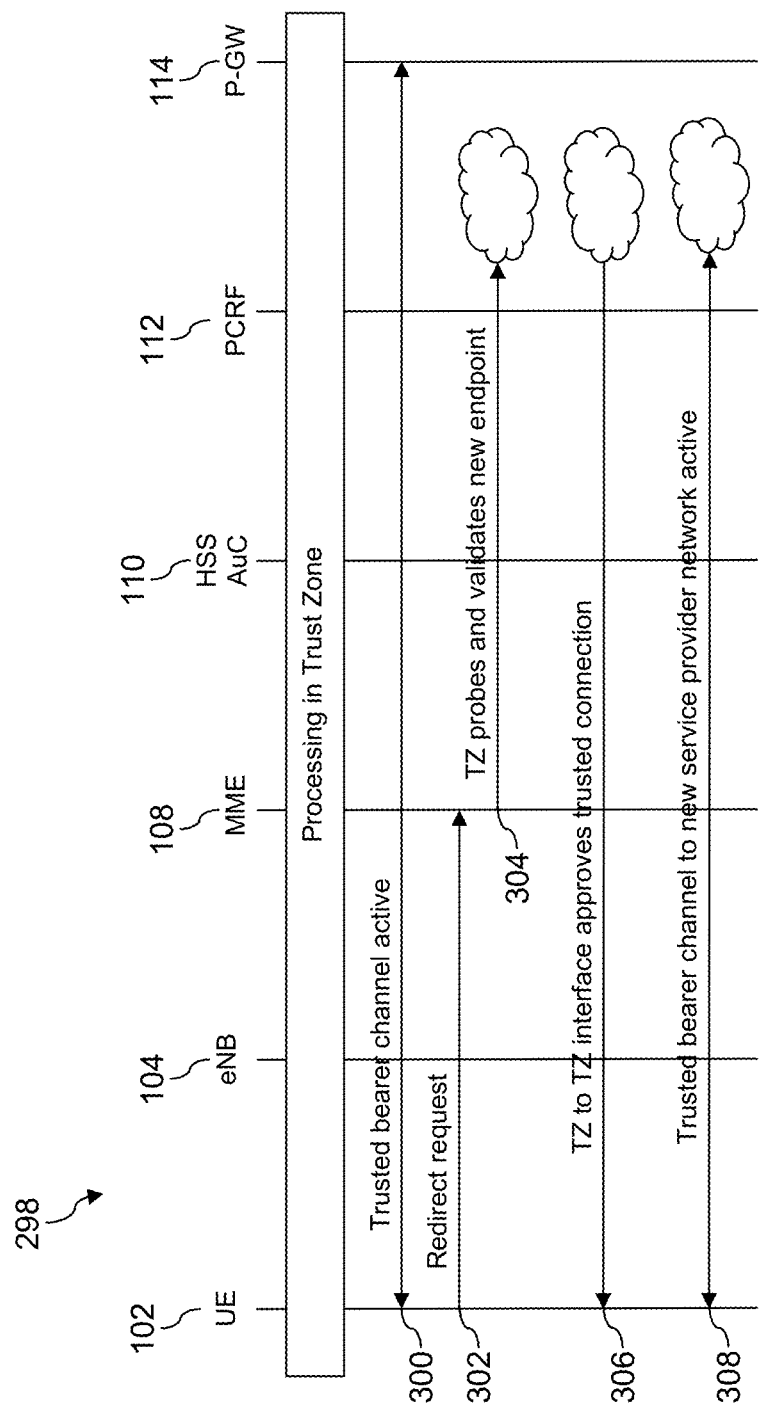
FIG. 6 is another message sequence diagram according to an embodiment of the disclosure.

Turning now to FIG. 6, a message sequence 298 is described. In an embodiment, the message sequence 298 may be performed when the UE 102 roams from a first service provider network into a second service provider network while the UE 102 is engaged in trusted communication using a trusted bearer path provided by the first service provider network. The box containing the text "processing in trust zone" represents that the several nodes and the UE 102 are processing in their respective trust zones. The label 300 shows the UE 102 engaged in communication over a trusted bearer channel via the enhanced node B 102 and the packet gateway 114. At label 302, in response to determining that the UE 102 is to roam into a second service provider network, either the UE 102 or the enhanced node B 104 sends a redirect request 302 to the mobility management entity 108. The mobility management entity 108 performs a probe or investigation of the trust zone processing capability of the second service provider network. The second service provider network sends a trust zone to trust zone interface trusted connection approval 306 to the UE 102 via the mobility management entity 108 and the enhanced node B 104. At label 308, the UE 102 is illustrated communicating via a trusted bearer channel provided by the second service provider network.

While not illustrated in FIG. 6, when the UE 102 is communicating via a trusted bearer channel provided by the second service provider network, the UE 102 may be provided a radio communication link by an enhanced node B operated by the second service provider network that is different from the enhanced node B 104 of the first service provider network. Likewise, the UE 102 may be coupled to the trusted bearer channel by a packet gateway operated by the second service provider network that is different from the packet gateway 114 of the first service provider network. In some cases, the packet gateway 114 of the first service provider network may continue to be a part of the trusted bearer channel or trusted bearer path, for example to connect to the server 178 which may continue to connected to the trusted bearer path even while the UE 102 has roamed into a foreign network or into the second service provider network.

It will be appreciated by one skilled in the art that the present disclosure contemplates a variety of alternative message sequences and flows based on the specific message sequences described above with reference to FIG. 3, FIG. 4, FIG. 5, and FIG. 6. For example, the flow of some messages may bypass some of the nodes described in the flow path from the UE 102 to other signaling nodes. Additionally, in some cases, the time sequence of some messages may be different. For example, in an embodiment, a node may exit its trust zone first and then send an exit trust zone request to another node. One skilled in the art will also appreciate that while the descriptions above are directed to the context of trusted communications in a long term evolution wireless network, that the descriptions may equally apply to other wireless communication networks. It is sometimes the case that new paradigms of communication that are first developed or invented for use in one communication system, for example the trusted signaling in a long term evolution wireless network described herein, may over time become a paradigm that is expropriated and used in later generation technologies.

Figure 7:
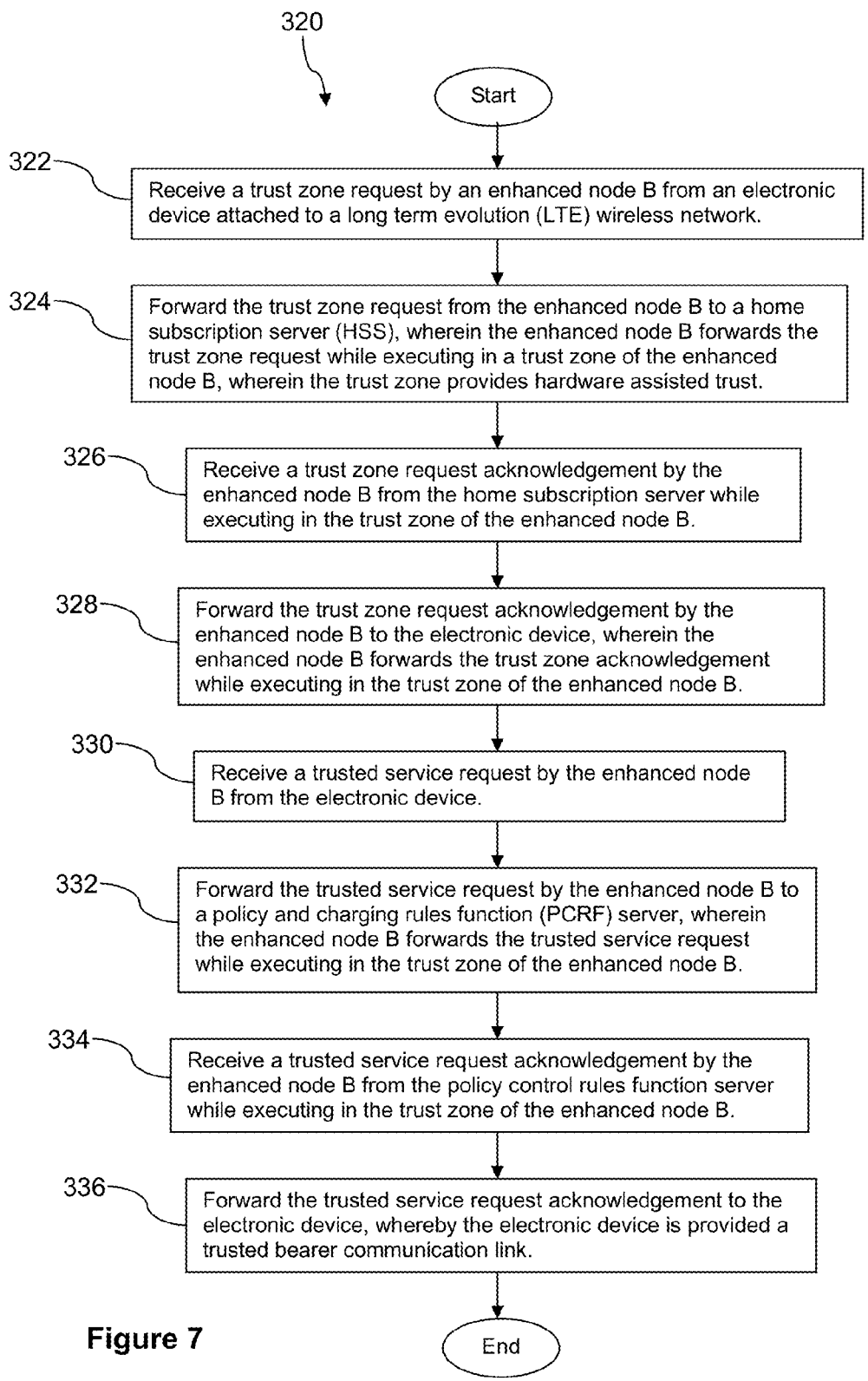
FIG. 7 is a flow chart of a method according to an embodiment of the disclosure.
Figure 8:
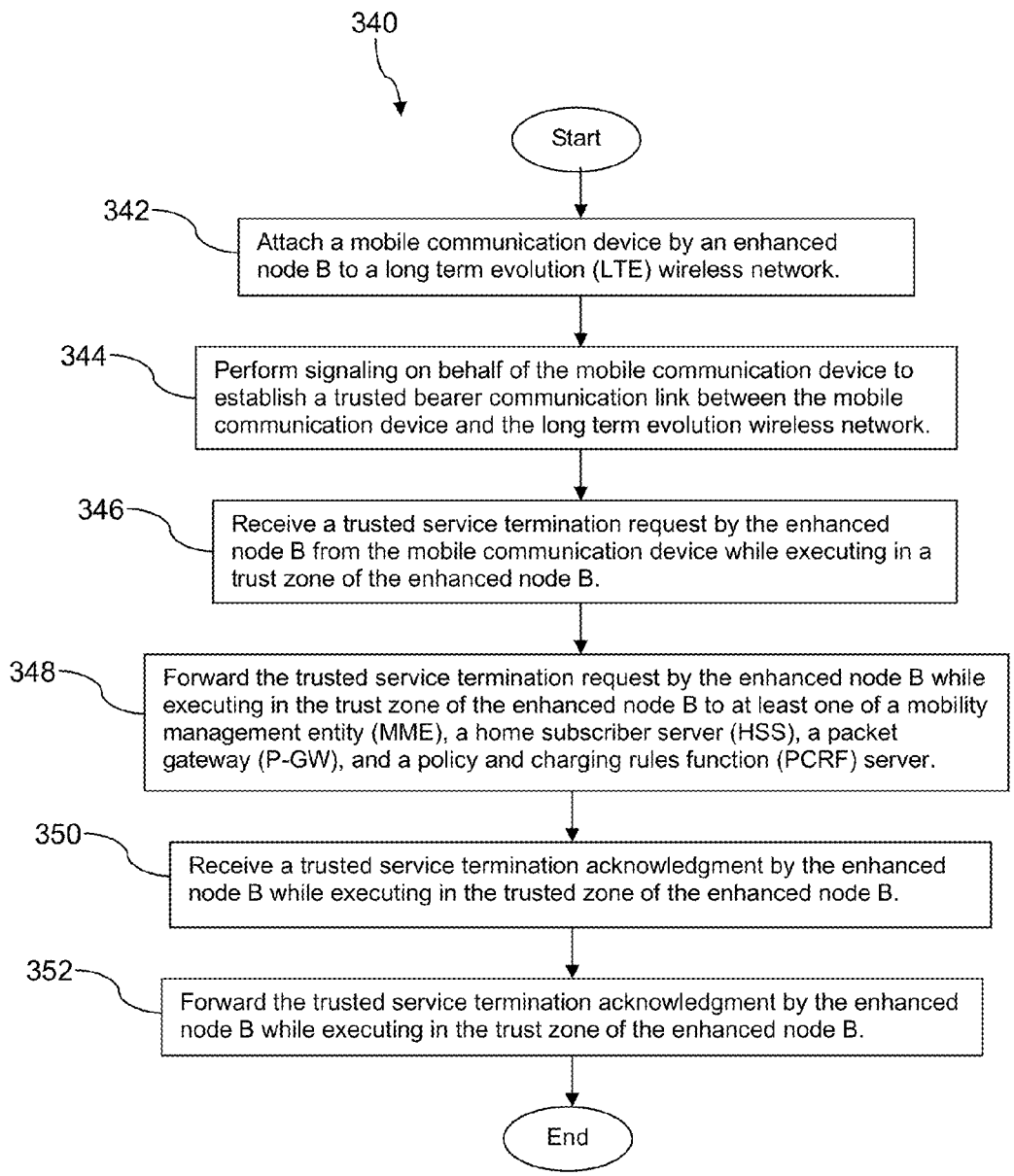
FIG. 8 is a flow chart of another method according to an embodiment of the disclosure.

Turning now to FIG. 7, a method 320 is described. At block 322, a trust zone request is received by an enhanced node B from an electronic device attached to a long term evolution (LTE) wireless network. For example, the enhanced node B 104 receives a trust zone request from the UE 102. At block 324, the trust zone request is forwarded from the enhanced node B to a home subscription server (HSS), wherein the enhanced node B forwards the trust zone request while executing in a trust zone of the enhanced node B, wherein the trust zone provides hardware assisted trust. At block 326, a trust zone request acknowledgement is received by the enhanced node B from the home subscription server while executing in the trust zone of the enhanced node B. At block 328, the trust zone request acknowledgement is forwarded by the enhanced node B to the electronic device, wherein the enhanced node B forwards the trust zone acknowledgement while executing in the trust zone of the enhanced node B. At block 330, a trusted service request is received by the enhanced node B from the electronic device. At block 332, the trusted service request is forwarded by the enhanced node B to a policy and charging rules function (PCRF) server, wherein the enhanced node B forwards the trusted service request while executing in the trust zone of the enhanced node B. At block 334, a trusted service request acknowledgement is received by the enhanced node B from the policy and charging rules function server while executing in the trust zone of the enhanced node B. At block 336, the trusted service request acknowledgement is forwarded to the electronic device, whereby the electronic device is provided a trusted bearer communication link Turning now to FIG. 8, a method 340 is described. At block 342, a mobile communication device attaches via an enhanced node B to a long term evolution (LTE) wireless network. For example, the UE 102 attaches via the enhanced node B 104 to a long term evolution wireless network. At block 344, signaling is performed on behalf of the mobile communication device to establish a trusted bearer communication link between the mobile communication device and the long term evolution wireless network. At block 346, a trusted service termination request is received by the enhanced node B from the mobile communication device while executing in a trust zone of the enhanced node B. At block 348, the trusted service termination request is forwarded by the enhanced node B while executing in the trust zone of the enhanced node B to at least one of a mobility management entity (MME), a home subscriber server (HSS), a packet gateway (P-GW), and a policy and charging rules function (PCRF) server. At block 350, a trusted service termination acknowledgment is received by the enhanced node B while executing in the trust zone of the enhanced node B. At block 352, the trusted service termination acknowledgment is forwarded by the enhanced node B while executing in the trust zone of the enhanced node B.

Figure 9:
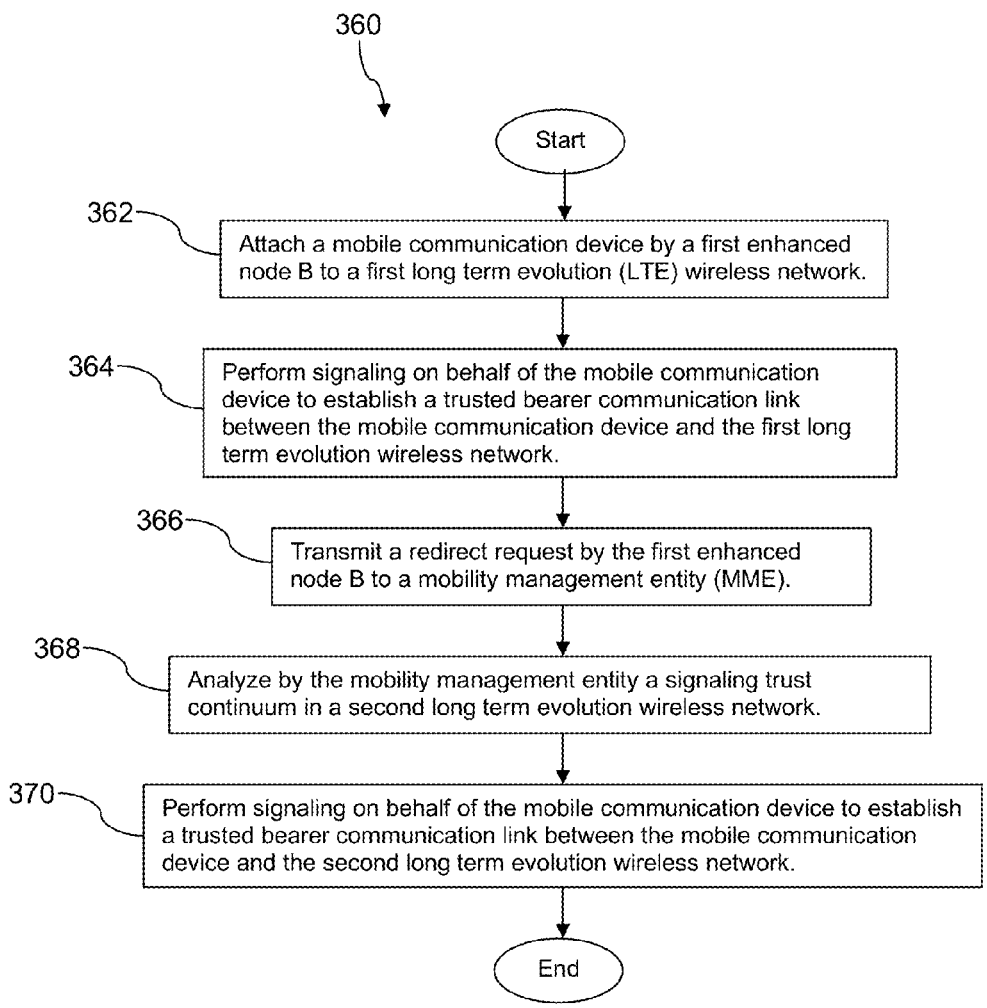
FIG. 9 is a flow chart of another method according to an embodiment of the disclosure.

Turning now to FIG. 9, a method 360 is described. At block 362, a mobile communication device attaches via a first enhanced node B to a first long term evolution (LTE) wireless network. For example the UE 102 attaches via the enhanced node B to a long term evolution wireless network of a first wireless service provider. At block 364, signaling is performed on behalf of the mobile communication device to establish a trusted bearer communication link between the mobile communication device and the first long term evolution wireless network. At block 366, a redirect request is transmitted by the first enhanced node B to a mobility management entity (MME). Alternatively, the mobile communication device may transmit the redirect request. A redirect request may be generated and transmitted, for example, when the mobile communication device roams from a radio access network of the first wireless service provider into the radio access network of a second wireless service provider.

At block 368, the mobility management entity analyzes a signaling trust continuum in a second long term evolution wireless network. At block 370, if the mobility management entity verifies the ability of the second long term evolution wireless network to support a trusted signaling path and/or a trusted bearer path, signaling is performed on behalf of the mobile communication device to establish a trusted bearer communication link between the mobile communication device and the second long term evolution wireless network. In an embodiment, this signaling may comprise forwarding a trust zone request from a second enhanced node B in the second long term evolution wireless network to a home subscription server (HSS) associated with the second long term evolution wireless network, wherein the second enhanced node B forwards the trust zone request while executing in a trust zone of the second enhanced node B and receiving a trust zone request acknowledgement by the second enhanced node B from the home subscription server while executing in the trust zone of the second enhanced node B. This signaling may further comprise forwarding the trust zone request acknowledgement by the second enhanced node B to the mobile communication device, wherein the second enhanced node B forwards the trust zone acknowledgement while executing in the trust zone of the second enhanced node B and receiving a trusted service request by the second enhanced node B from the mobile communication device.

Figure 10:
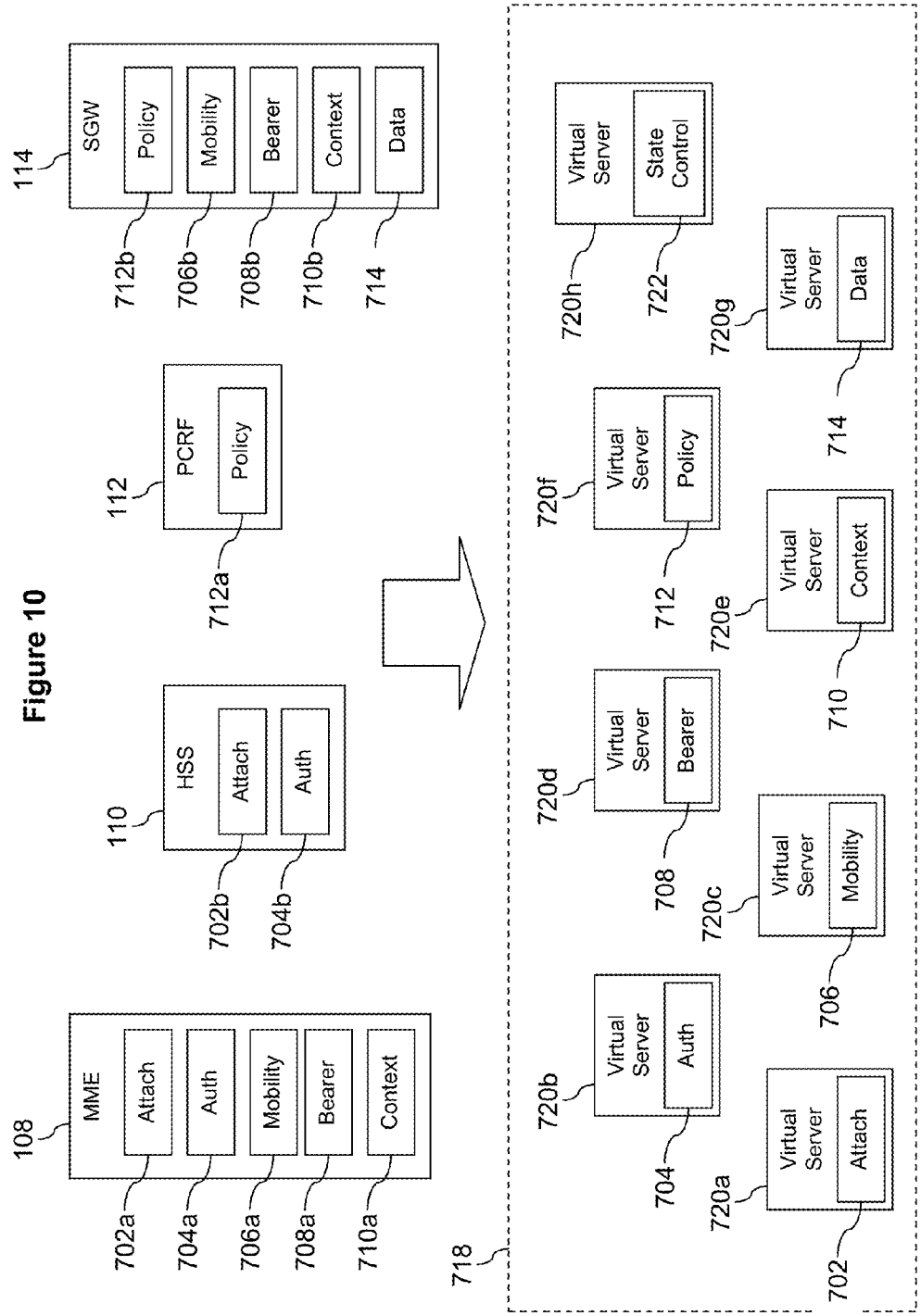
FIG. 10 is an illustration of a virtualized network function based communication paradigm according to an embodiment of the disclosure.

Turning now to FIG. 10, the virtualized network function communication paradigm is described. The traditional communication network may be considered to comprise isolated servers, each isolated server providing one of the network functions. For example, the mobility management entity 108, the home subscriber server 110, the policy and charging rules function server 112, and the serving gateway 114. In some cases, to handle communication processing loads, a network function may be distributed on a plurality of servers. It is understood that the communication network may comprise many other communication nodes, notably routers and other servers.

Each of the traditionally structured network function servers provide their processing functionality by executing one or more functions, for example a network attach function 702, an authentication function 704, a mobility function 706, a bearer function 708, a context function 710, a policy function 712, and a data function 714. Since some of these functions are performed by a plurality of network function servers, there is duplication of these functions in the traditionally structured network. This duplication may result in maintenance and/or common behavior problems over time.

One skilled in the art understands what these functions are, but for the sake of others reading this specification a thumbnail description of the functions is provided here. It is understood that the described common functions may perform additional tasks or functions that may not be mentioned here. It is further understood that other common functions may be factorized from traditional network functions and may be supported by the network function virtualization paradigm using the virtual computing environment 718.

The network attach function 702 provides functions that may be used by a service to attach to the network and communicate (e.g., a network attach function may be performed on behalf of the UE 102 in order for it to obtain communication service on the network 106). The authentication function 704 provides functions that may be used to authenticate users, for example to authenticate a user of the UE 102 who wishes to obtain communication service on the network 106. The mobility function 706 provides functions to support mobile communications, for example handoffs and continuity for the UE 102 when it is engaged in a voice call or other communication session. The bearer function 708 provides functions that contribute to maintaining a network connection over a period of time to support providing communication service (e.g., to carry bearer traffic). The context function 710 provides functions that promote service continuity during handoff, interruption, or transfer. The policy function 712 provides functions to support policy managed or policy constrained access to or use of a service. The data function 714 provides functions to support data creation, reading, update, and deletion (CRUD) functions.

The communication network may be restructured, at least in part, as common functions executing in virtual servers in a virtual computing environment 718 that are called by a state control application 722 that provides one of the traditional network functions (e.g., one of MME 108, HSS 110, PCRF 112, SGW 114, etc.) by calling the appropriate common functions and passing parameters or intermediate results between and/or among the common functions in a desired sequence. For example, an attach common function 702 may execute in a first virtual server 720a, an authentication common function 704 may execute in a second virtual server 720b, a mobility common function 706 may execute in a third virtual server 720c, a bearer common function 708 may execute in a fourth virtual server 720d, a context common function 710 may execute in a fifth virtual server 720e, a policy common function 712 may execute in a sixth virtual server 720f, and a data common function 714 may execute in a seventh virtual server 720g. The functionality of the MME 108, hence, may be provided by executing the attach common function 702 in the first virtual server 720a, the authentication common function 704 in the second virtual server 720b, the mobility common function 706 in the third virtual server 720c, the bearer common function 708 in the fourth virtual server 720d, and the context common function 710 in the fifth virtual server 720e. The functionality of the HSS 110 may be provided by executing the attach common function 702 on the first virtual server 720a and by executing the authentication common function 704 on the second virtual server 720b. Thus, the common functionality of network attach can be provided to both the MME 108 and to the HSS 110 from the same attach common function 702 executing on the virtual server 720a. This restructuring of the traditional siloed network functions into common functions may be referred to as network function factorization or factorization. Different traditional network functions would be associated with different state control applications 722 and would execute on different virtual servers 720.

A single virtual server 720 may concurrently execute a plurality of instances of a common function. For example, the first virtual sever 720a may concurrently execute 2 instances of the attach common function 702, 4 instances of the attach common function 702, 8 instances of the attach common function 702, or some other number of instances of the attach common function 702. Additionally, a plurality of virtual servers 720, each executing instances of the same common function, may be deployed to carry a communication load. For example, 2, 3, or more instances of the first virtual sever 720a may execute instances of the attach common function 702. In an embodiment, any one virtual server 720 executes instances of only one common function. For example, no virtual server 720 would concurrently execute instances of different common functions.

Figure 11:
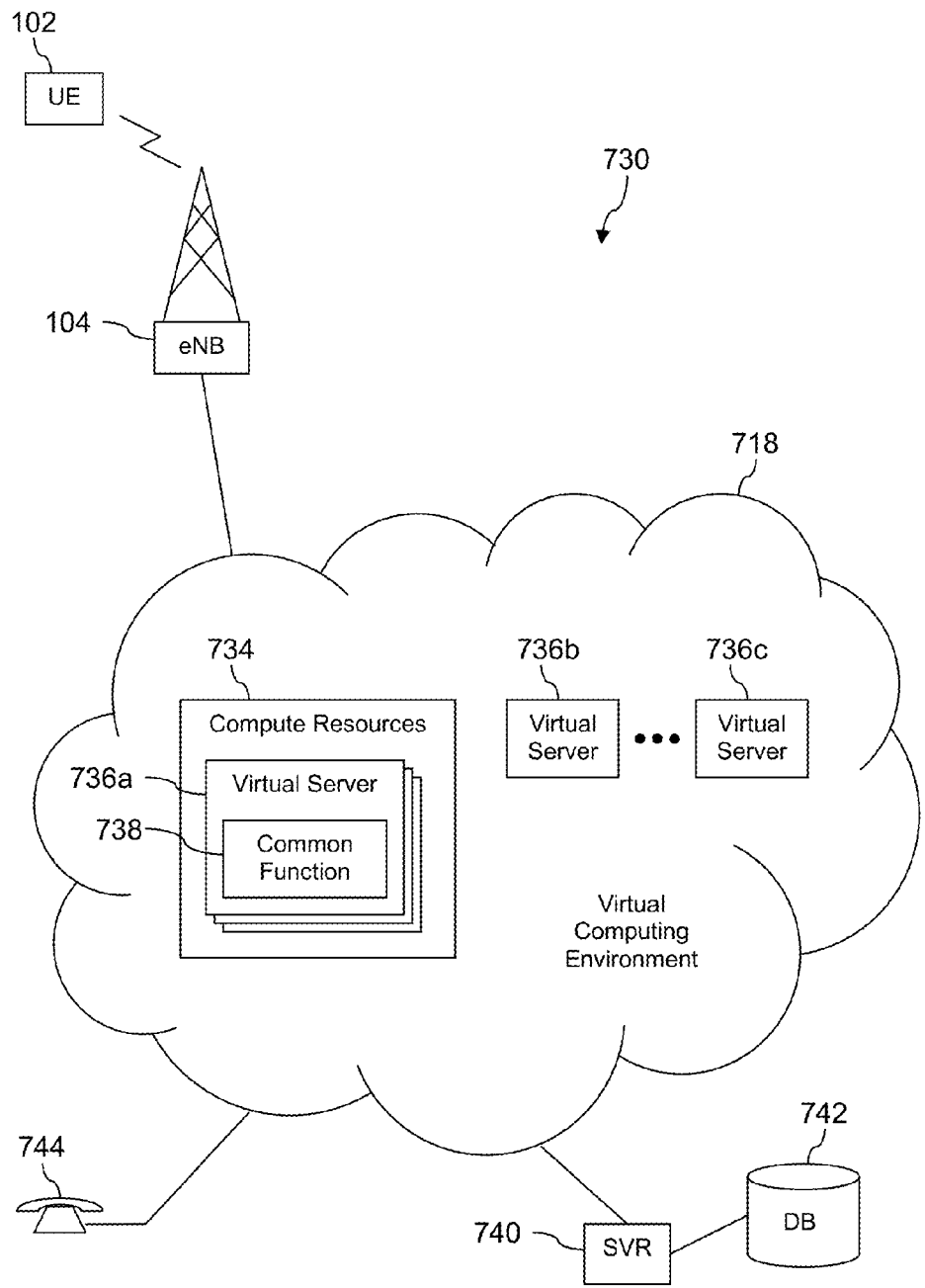
FIG. 11 is a block diagram of virtual computing environment according to an embodiment of the disclosure.

Turning now to FIG. 11, a communication system 730 is described. From some points of view, the communication system 730 is substantially similar to the communication system 100 described above with reference to FIG. 1. For example, from the point of view of the UE 102 and the enhanced node B 104, the systems 100, 730 may be indistinguishable. From the point of view of a content server 740 (or application server) or of a telephone 744, the systems 100, 730 may be indistinguishable. Communication between the enhanced node B 104 and the content server 740 or the telephone 744 provides data and/or voice services in substantially similar ways over substantially similar interfaces, regardless of what implementation of the core network—system 100 or system 730—is deployed. The use of a virtual computing environment 718 to provide at least some of the core network functionality can provide significant advantages to the wireless communication service provider.

The virtual computing environment 718 may support ease of maintenance, ease of upgrading, ease of expansion and contraction of compute resources. The virtual computing environment 718 may be provided with a private environment of compute resources or with a public deployment of compute resources. Said in another way, the virtual computing environment 718 may be a private cloud computing environment owned, operated, and managed by a wireless communication service provider. Alternatively, the virtual computing environment 718 may be a public cloud computing deployment owned, operated, and managed by a cloud computing service provider and supporting not only the core network functionality of a wireless communication service provider but also supporting computing needs of web-based enterprises, large on-line retail sales enterprises, governmental entities, and the like.

The virtual computing environment 718 may comprise a variety of compute resources 734. The compute resources 734 comprises processors (e.g., microprocessors, digital signal processors, graphics processors), main memory, mass memory (e.g., disk drives), and network interfaces. The processors may comprise a single processor unit or may comprise multiple processor units. For example, a processor may comprise a quad-core processor having four distinct processing units. Alternatively, a processor may contain some other number of distinct processing units. The mass memory may be located in physical proximity to the computer blade on which a virtual server executes that uses the mass memory. Alternatively, the mass memory may be located remote from the computer blade on which the virtual server 736 executes and may be addressed or accessed logically. The compute resources 734 may be partly deployed as blade computers in a rack of an equipment cabinet. A single virtual server 736 may execute on one computer host or computer blade, or a plurality of virtual servers 736 may execute on one computer host or computer blade.

The virtual server 736 may be built or deployed as a server image. A server image may comprise instructions or logic that can be loaded into main memory of a compute resource (a blade computer) or on top of a hypervisor and then executed to provide the functionality of the virtual server. A server image may be viewed as a kind of template for creating or instantiating a virtual server. The same server image may be used to instantiate multiple virtual servers, either on the same compute resource or on separate compute resources. The server image may be constructed or built targeted to a category or class of compute resources, and a virtual server instantiated from that server image may take advantage of or employ the compute resources that comport with that class of compute resources. For example, when a first server image is built according to a class of compute resources that includes a graphics processor, a virtual server instantiated from that first server image may employ the resources of one or more graphics processors. When a second server image is built according to a class of compute resources that includes a trusted security zone, a virtual server instantiated from that second server image may employ the resources of a trusted security zone.

The virtual computing environment 718 may comprise a first virtual server 736*a* executing on the compute resources 734 that performs processing of a common function 738. A second virtual server 736*b* and a third virtual server 736*c* may likewise execute on the computer resources 734 and may perform processing of the same common function 738 or different common functions. It is understood that the compute resources 734 may be viewed as the collection of all the compute resources in the virtual computing environment 718: a plurality of processors, main memories, mass memories, and network interfaces. The virtual computing environment 718 may comprise any number of active or instantiated virtual servers 736.

A communication may be initiated by the UE 102 by establishing a wireless communication link with the enhanced node B 104. The enhanced node B 104 may establish a communication link with the virtual computing environment 718, for example over a data communication interface such as an S1-U interface or an S1-C interface. The communication may be serviced by a plurality of network virtual functions and a plurality of common functions within the virtual computing environment 718 and link to the content server 740 to access content stored in a datastore 742 or to link to the telephone 744 to conduct a voice call.

In an embodiment, the UE 102 initiates a trusted communication, for example to access confidential information via the content server 740 and the datastore 742 (e.g., medical records, bank account information, or credit history information). The wireless link between the UE 102 and the enhanced node B 104 may be deemed to be inherently trusted or secure from hacking. The enhanced node B 104 may request a trusted communication link with the content server 740 by engaging in trusted signaling with the virtual computing environment 718. The enhanced node B 104 sends a trusted link request via a S1 interface to the virtual computing environment 718. A virtual server 736 may recognize the trusted link request and cause a common function 738 to transition to executing its trustlet. The trustlet executes in a trusted security zone provided by the underlying compute resources 734 in which the subject trustlet and virtual server 736 execute. The trustlet sends trust tokens to the enhanced node B 104 via the S1 interface, and a trusted communication link is established between the common function 738 and the enhanced node B 104. The trustlet may then signal with other virtual servers 736 and other common functions 738 to provide the appropriate virtualized network functions to support the desired trusted communication. One of the common functions may be the bearer common function 708 that provides the trusted communication link to the server 740. The bearer common function 708, likewise executing in its trustlet in a trusted security zone of the compute resources 734 in which its virtual server 736 executes, signals with the content server 740 to establish a trusted communication link. When the content server 740 provides the appropriate trust tokens and handshaking, the end-to-end trusted bearer path from the UE 102 to the content server 740 (or to the telephone 744, depending on the communication scenario) may be established.

Figure 12:
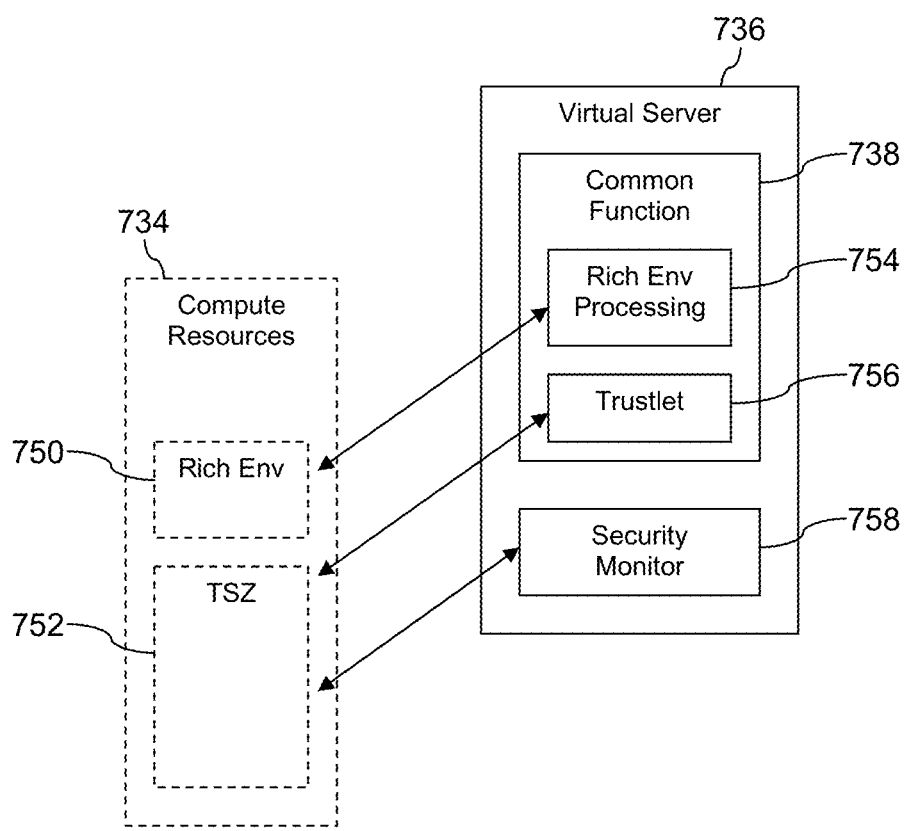
FIG. 12 is a block diagram of the relationship between an executing virtual server and compute resources on which the virtual server is executed according to an embodiment of the disclosure.

Turning now to FIG. 12, the overlay of a virtual server 736 on compute resources 734 is described. The virtual server 736 executes using compute resources 734. The virtual server 736 may not directly interact with the compute resources 734 and instead may run on top of a hypervisor or on top of a logical operating system (an operating system that itself operates in the context of another operating system). Notwithstanding, the processing provided by the virtual server 736 is performed using the compute resources 734. The compute resources 734 may comprise a rich environment 750 and a trusted security zone 752. The details of trusted security zones are described further above. To briefly reprise here, a trusted security zone provides hardware assisted trust or hardware assisted security. A trusted security zone may comprise a portion of main memory. An operating system may mediate access to the main memory and may enforce the constraint that only instructions executing in trust may access the trusted portion of memory. Alternatively, the trusted portion of main memory may be physically isolated and only physically accessible to a trusted portion of a processor. A trusted security zone may be supported by a fundamental operation mode of processor units that prevents other potentially untrusted instructions executing concurrently with the trusted instructions (e.g., intercalated with the trusted instructions, as in a context switching situation or possibly when executed on a co-processor of a multi-core processor).

The rich environment 750 is the portion of main memory that is not trusted and any mass memory allocated to the virtual server 736. The rich environment 750 comprises the processor units that are not configured to have a trusted mode of operation or are not currently operating in a trusted mode of operation. The rich environment 750 may be considered to further comprise operating system commands that are disallowed when executing in the trusted mode of operation and/or accessing network interfaces that may be disallowed when executing in the trusted mode of operation.

The common function 738 executing in the virtual server 736 may comprise rich environment processing logic or instructions 754 and a trustlet 756. The rich environment processing 754 executes in the rich environment 750 of the computer resources 734, and the trustlet 756 executes in the trusted security zone 752. A security monitor 758 may be part of an operating system in which the virtual server 736 executes or may be provided as part of the server image that is used to instantiate the virtual server 736. The security monitor 758 executes in the trusted security zone 752. The virtual server 736 may be configured or created to map execution of the trustlet 756 and the security monitor 758 to the trusted security zone 752. The security monitor 758 may be referred to in some contexts as a security monitor module or a security monitor component.

The security monitor 758 may be configured with an execution invocation handle (e.g., a logical address) of the trustlet 756 that it can use to launch and terminate the trustlet 756. The security monitor 758 may further be configured with the location of a trust flag in main memory of the compute resources 734 or configured with a logical address that the operating system may map to a physical address to access the trust flag in main memory. The security monitor 758 may periodically poll the trust flag. When the trust flag is unset, no trusted communication request is pending. When the trust flag is set, a trusted communication request is pending. The security monitor 758 may further be configured with a physical address of a trusted communication request parameter list (or a logical address that the operating system can map to the trusted communication request parameter list). To handle a pending trusted communication request, the security monitor 758 may access and read the trusted communication request parameters. The security monitor 758 may first validate the trusted communication request parameters, for example validating a trust token provided in the parameters list.

The security monitor 758 may then cause the operating system (or may itself) to pause the rich environment processing 754 and may instantiate the trustlet 756, passing the trusted communication request parameters to the trustlet 756. Instantiating the trustlet 756 may be referred to in some contexts as allocating the trustlet 756 or allocating the trustlet 756 to the common function 738. The trustlet 756 may then handshake with the requesting communication node or common function and carry on trusted communications. When the trustlet 756 indicates that the trusted communication session is completed, the security monitor 758 may terminate the trustlet 756 and cause the rich environment processing 754 to resume execution.

In an embodiment, the security monitor 758 may maintain a registry of trustlets 756, for example in the situation where a plurality of instances of the common function 738 are executing on the same virtual server 736. The registry of trustlets 756 may comprise information associated with instantiated trustlets 756, for example an execution handle to use in communicating with each instantiated trustlet 756, a trust token, state information such as communication parameters associated with the instantiated trustlet 756.

Figure 13:
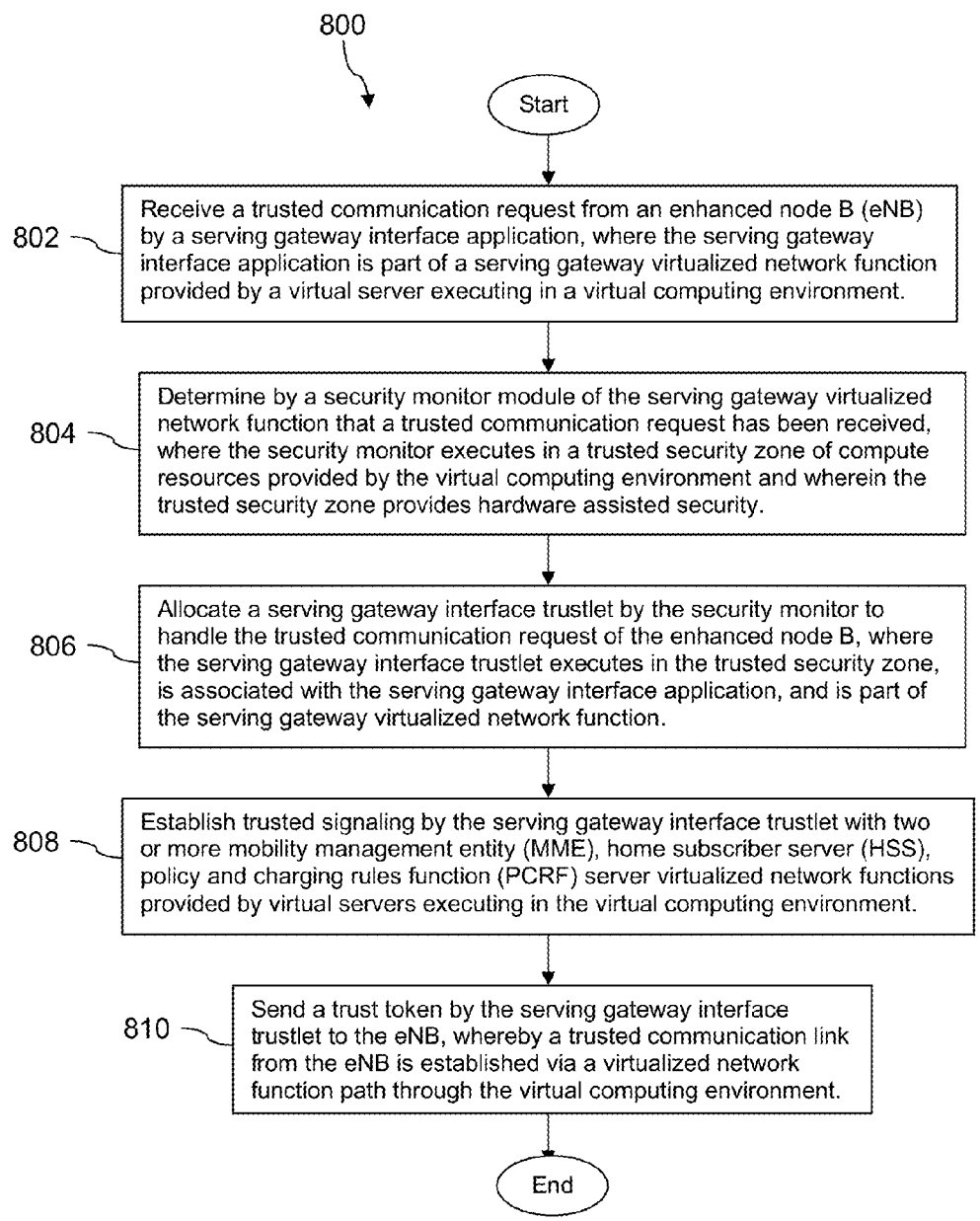
FIG. 13 is a flow chart of a method according to an embodiment of the disclosure.

Turning now to FIG. 13, a method 800 is described. Method 800 is a method of wireless communication enabled by hardware assisted security. At block 802, a serving gateway interface application receives a trusted communication request from an enhanced node B. In an embodiment, the serving gateway interface application may implement a 3GPP interface, such as a S1 interface. The serving gateway interface application is part of a serving gateway virtualized network function provided by a virtual server executing in a virtual computing environment. At block 804, a security monitor module or a security monitor component of the serving gateway virtualized network function determines that a trusted communication request has been received. The security monitor executes in a trusted security zone of compute resources provided by the virtual computing environment. The trusted security zone provides hardware assisted security.

At block 806, the security monitor allocates a serving gateway interface trustlet to handle the trusted communication request of the enhanced node B. The serving gateway interface trustlet executes in the trusted security zone, is associated with the serving gateway interface application, and is part of the serving gateway virtualized network function. At block 808, the serving gateway interface trustlet establishes trusted signaling with two or more mobility management entity, home subscriber server, policy and charging rules function server virtualized network functions provided by virtual servers executing in the virtual computing environment. At block 810, the serving gateway interface trustlet sends a trust token to the enhanced node B, whereby a trusted communication link from the enhanced node B to a destination point (e.g., the content server 740 or the telephone 744) is established via a virtualized network function path through the virtual computing environment.

Figure 14:
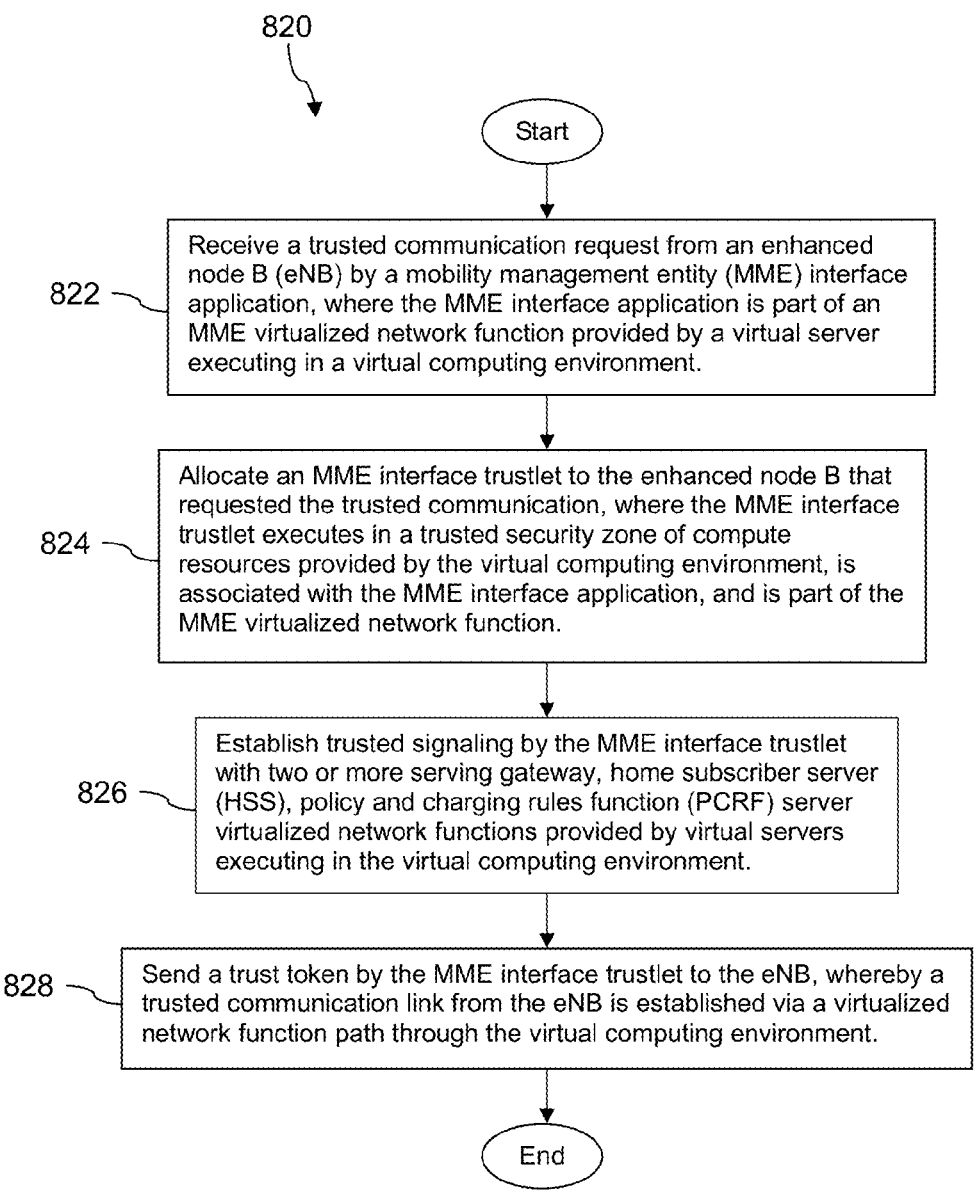
FIG. 14 is a flow chart of another method according to an embodiment of the disclosure.

Turning now to FIG. 14, a method 820 is described. Method 820 is a method of wireless communication enabled by hardware assisted security. At block 822, a mobility management entity interface application receives a trusted communication request from an enhanced node B. The mobility management entity interface application may implement an 3GPP interface such as an S1 interface. The mobility management entity interface application is part of a mobility management entity virtualized network function provided by a virtual server executing in a virtual computing environment. At block 824, a mobility management entity interface trustlet is allocated to the enhanced node B that requested the trusted communication. The mobility management entity interface trustlet executes in a trusted security zone of compute resources provided by the virtual computing environment, is associated with the mobility management entity interface application, and is part of the mobility management entity virtualized network function;

At block 826, the mobility management entity interface trustlet establishes trusted signaling with two or more serving gateway, home subscriber server, policy and charging rules function server virtualized network functions provided by virtual servers executing in the virtual computing environment. At block 828, the mobility management entity interface trustlet sends a trust token to the enhanced node B, whereby a trusted communication link from the enhanced node B to a destination point (e.g., the content server 740 or the telephone 744) is established via a virtualized network function path through the virtual computing environment.

Figure 15:
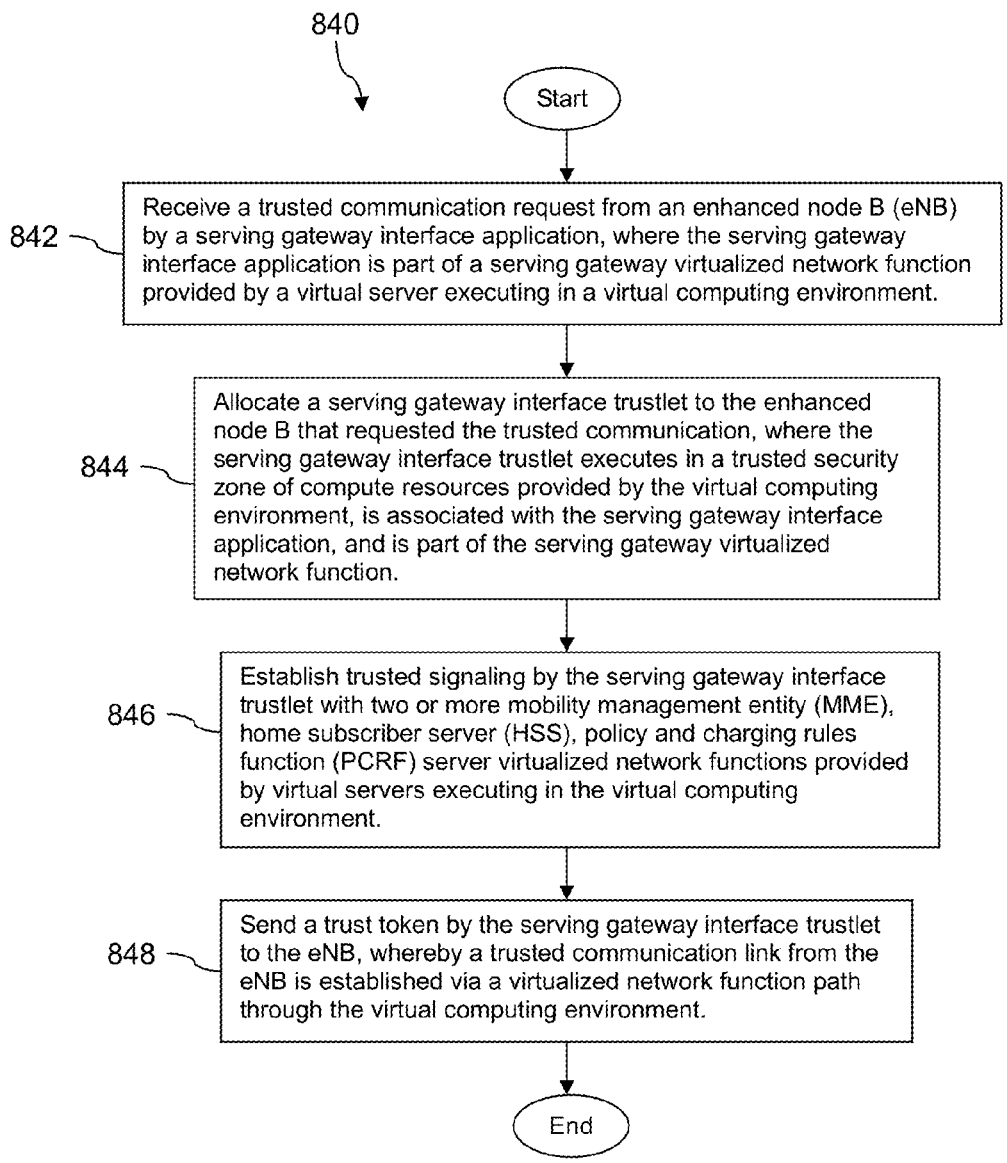
FIG. 15 is a flow chart of yet another method according to an embodiment of the disclosure.

Turning now to FIG. 15, a method 840 is described. Method 840 is a method of wireless communication enabled by hardware assisted security. At block 842, a serving gateway interface application receives a trusted communication request from an enhanced node B. The serving gateway interface application is part of a serving gateway virtualized network function provided by a virtual server executing in a virtual computing environment. At block 844, a serving gateway interface trustlet is allocated to the enhanced node B that requested the trusted communication. The serving gateway interface trustlet executes in a trusted security zone of compute resources provided by the virtual computing environment, is associated with the serving gateway interface application, and is part of the serving gateway virtualized network function.

At block 846, the serving gateway interface trustlet establishes trusted signaling with two or more mobility management entity, home subscriber server, policy and charging rules function server virtualized network functions provided by virtual servers executing in the virtual computing environment. At block 848, the serving gateway interface trustlet sends a trust token to the enhanced node B, whereby a trusted communication link from the enhanced node B is established via a virtualized network function path through the virtual computing environment.

Figure 16:
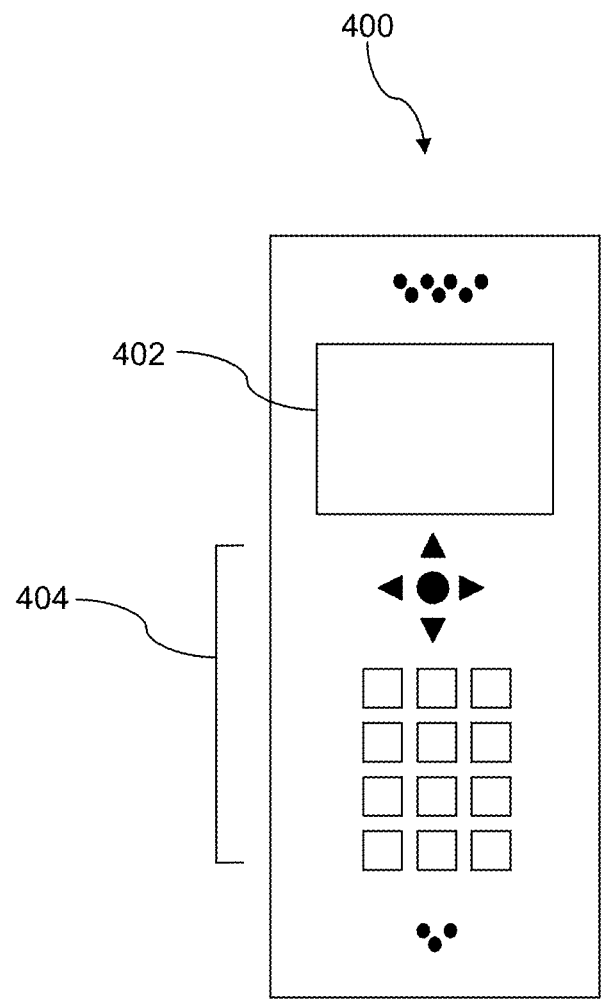
FIG. 16 is an illustration of a handset according to an embodiment of the disclosure.

FIG. 16 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, a media player, or a wireless enabled computer, for example a long term evolution wireless enabled computer. The mobile device 400 includes a display 402 and a touch-sensitive surface and/or keys 404 for input by a user.

The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 17:
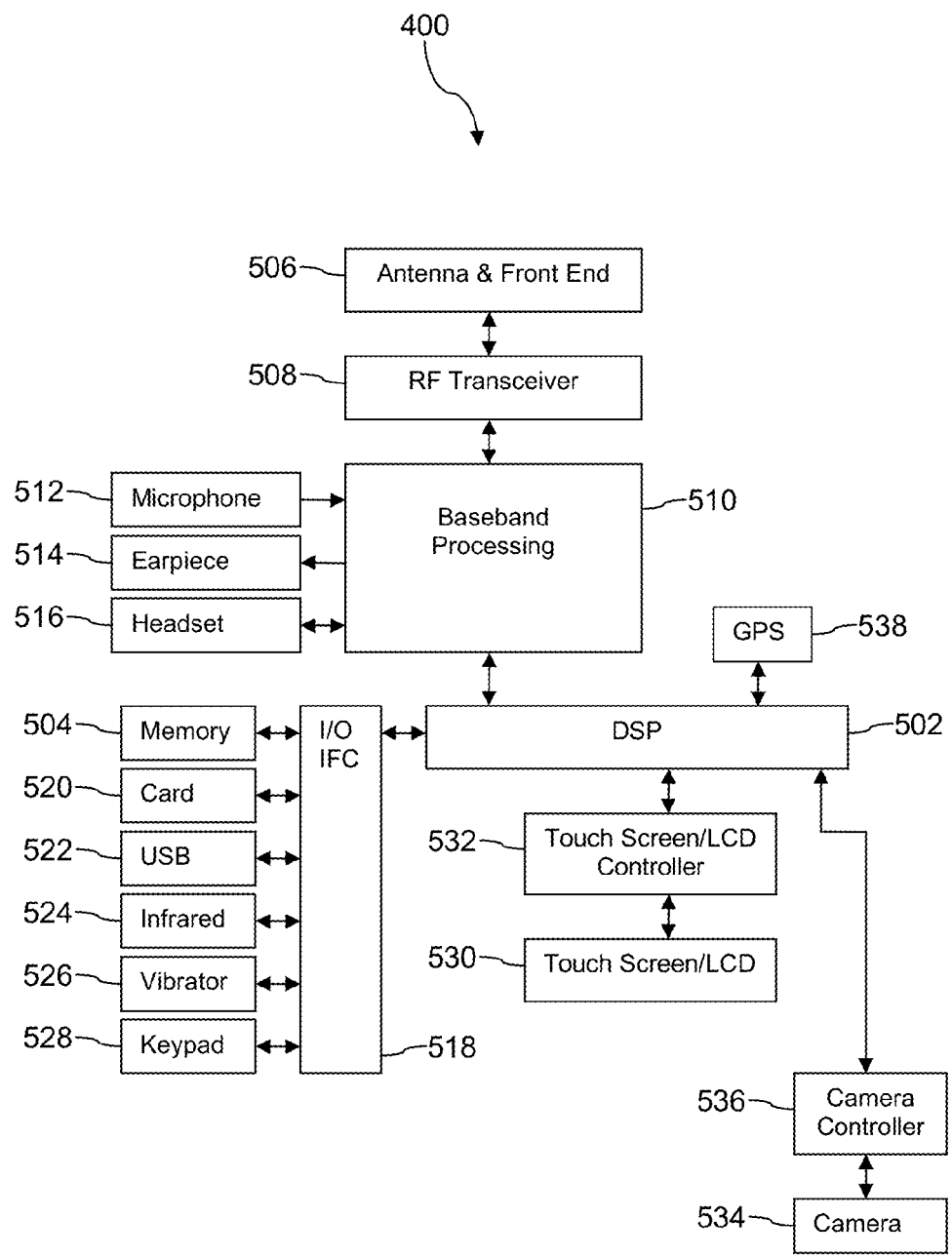
FIG. 17 is a block diagram of a hardware architecture of a handset according to an embodiment of the disclosure.

FIG. 17 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 18A:
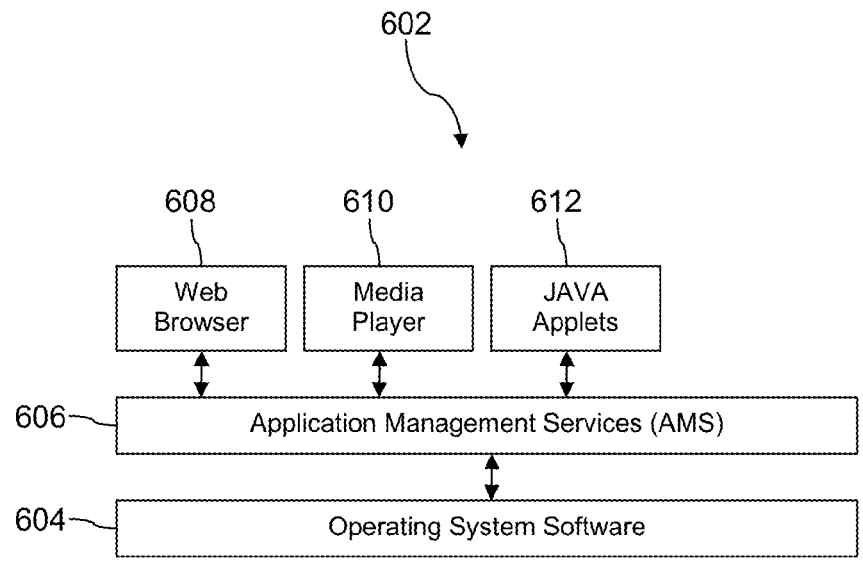
FIG. 18A is block diagram of a software architecture of a handset according to an embodiment of the disclosure.

FIG. 18A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 18A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 18B:
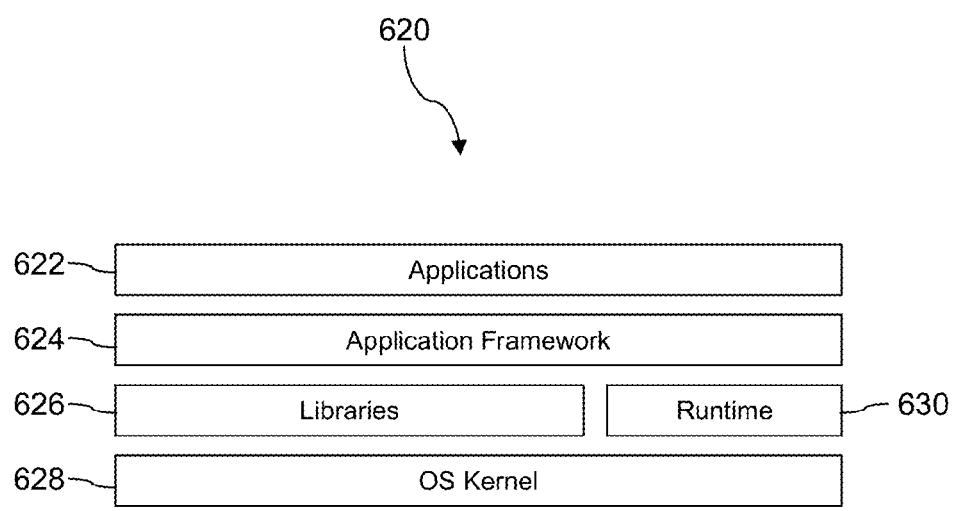
FIG. 18B is a block diagram of another software architecture of a handset according to an embodiment of the disclosure.

FIG. 18B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 19:
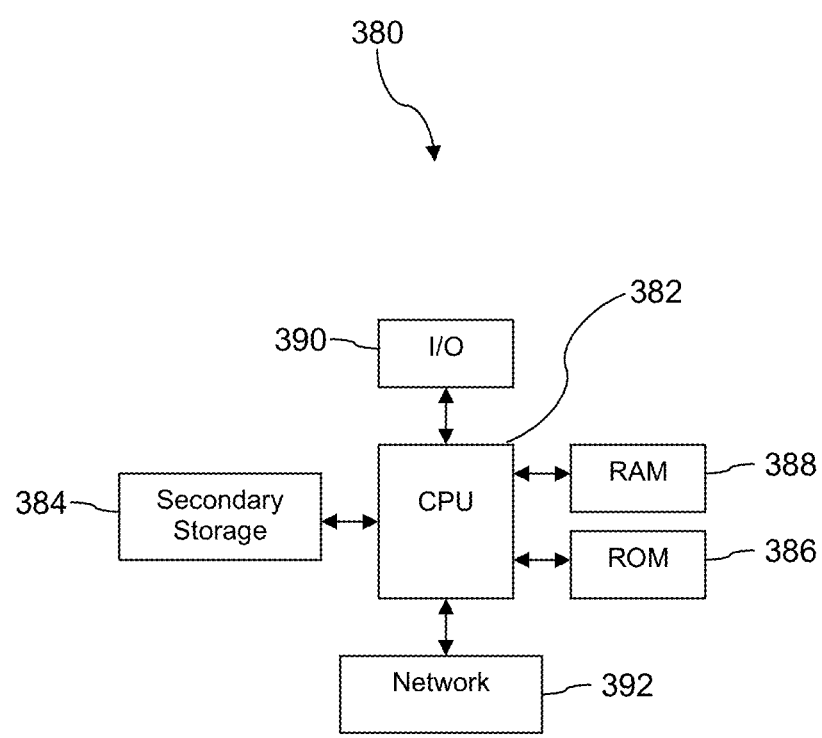
FIG. 19 is a block diagram of a computer system according to an embodiment of the disclosure.

FIG. 19 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wireless communication enabled by hardware assisted security, comprising:
receiving a trusted communication request from an enhanced node B (eNB) by a serving gateway interface application, where the serving gateway interface application is part of a serving gateway virtualized network function provided by a virtual server executing in a virtual computing environment;
determining by a security monitor module of the serving gateway virtualized network function that a trusted communication request has been received, where the security monitor module executes in a trusted security zone of compute resources provided by the virtual computing environment and wherein the trusted security zone provides hardware assisted security;
allocating a serving gateway interface trustlet by the security monitor module to handle the trusted communication request of the eNB, where the serving gateway interface trustlet executes in the trusted security zone, is associated with the serving gateway interface application, and is part of the serving gateway virtualized network function;
establishing trusted signaling by the serving gateway interface trustlet with two or more mobility management entity (MME), home subscriber server (HSS), policy and charging rules function (PCRF) server virtualized network functions provided by virtual servers executing in the virtual computing environment; and
sending a trust token by the serving gateway interface trustlet to the eNB, whereby a trusted communication link from the eNB is established via a virtualized network function path through the virtual computing environment.

2. The method of claim 1, wherein the virtual server that provides the serving gateway network function is configured to map execution of the security monitor module and execution of trustlets allocated by the security monitor module to the trusted security zone of the compute resources provided by the virtual computing environment in which the virtual server executes.

3. The method of claim 2, wherein the virtual server that provides the serving gateway network function is configured to map execution of the serving gateway interface application to a rich execution zone of the compute resources provided by the virtual computing environment in which the virtual server executes.

4. The method of claim 2, wherein the security monitor module determines that the trusted communication request has been received by polling the serving gateway interface application at a periodic rate.

5. The method of claim 4, wherein the security monitor module maintains a registry of trustlets, wherein each registry entry associates a trustlet to a trust token associated with the trustlet, and wherein the security monitor module allocates a trustlet based on a trust token embedded in a received trust request.

6. The method of claim 1, wherein the serving gateway virtualized network function comprises at least two common functions selected from a policy function, a mobility function, a bearer function, a context function, and a data function.

7. The method of claim 6, wherein the MME, HSS, and PCRF server virtualized network functions comprise common functions selected from the policy function, the mobility function, the bearer function, the context function, and the data function.

8. A method of wireless communication enabled by hardware assisted security, comprising:
receiving a trusted communication request from an enhanced node B (eNB) by a mobility management entity (MME) interface application, where the MME interface application is part of an MME virtualized network function provided by a virtual server executing in a virtual computing environment;

allocating an MME interface trustlet to the eNB that requested the trusted communication, where the MME interface trustlet executes in a trusted security zone of compute resources provided by the virtual computing environment, is associated with the MME interface application, and is part of the MME virtualized network function;

establishing trusted signaling by the MME interface trustlet with two or more serving gateway, home subscriber server (HSS), policy and charging rules function (PCRF) server virtualized network functions provided by virtual servers executing in the virtual computing environment; and sending a trust token by the MME interface trustlet to the eNB, whereby a trusted communication link from the eNB is established via a virtualized network function path through the virtual computing environment.

9. The method of claim 8, wherein the virtual computing environment is a cloud computing environment.

10. The method of claim 8, wherein the eNB is a wireless communication transceiver that established wireless communication links with user equipments (UEs) according to at least one of a long term evolution (LTE), a code division multiple access (CDMA), a global system for mobile communication (GSM), and a worldwide interoperability for microwave access (WiMAX) wireless communication protocol.

11. The method of claim 8, wherein the virtualized network functions are provided by common functions comprising a policy function, a mobility function, a bearer function, a context function, an authentication function, an attach function, and a data function.

12. The method of claim 11, wherein the policy function and the data function are executed in a trusted security zone of compute resources provided by the virtual computing environment.

13. The method of claim 11, wherein the MME virtualized network function is provided by the attach function, the authentication function, the mobility function, the bearer function, and the context function and the serving gateway virtualized network function is provided by the policy function, the mobility function, the bearer function, the context function, and the data function.

14. A method of wireless communication enabled by hardware assisted security, comprising:

receiving a trusted communication request from an enhanced node B (eNB) by a serving gateway interface application, where the serving gateway interface application is part of a serving gateway virtualized network function provided by a virtual server executing in a virtual computing environment;

allocating a serving gateway interface trustlet to the eNB that requested the trusted communication, where the serving gateway interface trustlet executes in a trusted security zone of compute resources provided by the virtual computing environment, is associated with the serving gateway interface application, and is part of the serving gateway virtualized network function;

establishing trusted signaling by the serving gateway interface trustlet with two or more mobility management entity (MME), home subscriber server (HSS), policy and charging rules function (PCRF) server virtualized network functions provided by virtual servers executing in the virtual computing environment; and sending a trust token by the serving gateway interface trustlet to the eNB, whereby a trusted communication link from the eNB is established via a virtualized network function path through the virtual computing environment.

15. The method of claim 14, wherein the virtualized network functions are provided, at least in part, by common functions comprising a policy function, a mobility function, a bearer function, a context function, an authentication function, an attach function, and a data function.

16. The method claim 15, wherein each common function is executed in one or more virtual servers and where different common functions do not execute on the same virtual server.

17. The method of claim 16, wherein the policy function and the data function are executed in a trusted security zone of compute resources provided by the virtual computing environment.

18. The method of claim 17, wherein the virtual servers in which the policy function and the data function execute are instantiated from server images that incorporate trusted security zone operating system support.

19. The method of claim 18, wherein a security monitor is part of the trusted security zone operating system support incorporated in the server images from which the virtual servers that the policy function and data function execute in are instantiated, and wherein the security monitor instantiates trustlets of the policy function and of the data function on their respective virtual servers.

20. The method of claim 19, wherein the trustlet of the policy function performs trusted instructions associated with the policy function on the virtual server executing the policy function and the trustlet of the data function performs trusted instructions associated with the data function on the virtual server executing the data function.

* * * * *